US012406665B2

(12) United States Patent
Singh

(10) Patent No.: US 12,406,665 B2
(45) Date of Patent: Sep. 2, 2025

(54) PROCESSING VOICE INPUT IN INTEGRATED ENVIRONMENT

(71) Applicant: Adeia Guides Inc., San Jose, CA (US)

(72) Inventor: Gyanveer Singh, Bihar (IN)

(73) Assignee: ADEIA GUIDES INC., San Jose, CA (US)

(*) Notice: Subject to any disclaimer, the term of this patent is extended or adjusted under 35 U.S.C. 154(b) by 307 days.

(21) Appl. No.: 17/744,117

(22) Filed: May 13, 2022

(65) Prior Publication Data
US 2023/0368785 A1 Nov. 16, 2023

(51) Int. Cl.
*G10L 15/22* (2006.01)

(52) U.S. Cl.
CPC .................... *G10L 15/22* (2013.01)

(58) Field of Classification Search
CPC ......... G10L 15/22; G10L 15/18; G10L 15/28; G10L 15/30; G06F 3/167; G06F 40/20
See application file for complete search history.

(56) References Cited

U.S. PATENT DOCUMENTS

| | | | |
|---|---|---|---|
| 10,018,977 B2* | 7/2018 | Cipollo | G10L 15/22 |
| 10,354,011 B2* | 7/2019 | Nell | G06F 3/167 |
| 10,503,832 B2 | 12/2019 | Malhotra et al. | |
| 10,530,598 B2 | 1/2020 | Ansari et al. | |
| 10,679,133 B1* | 6/2020 | Mathur | G06N 5/02 |
| 10,685,652 B1* | 6/2020 | Cherukuri | G06F 3/167 |
| 10,699,707 B2* | 6/2020 | James | G10L 15/22 |
| 10,929,372 B2 | 2/2021 | Kelly et al. | |
| 11,062,700 B1* | 7/2021 | Azimi | G10L 15/18 |
| 11,100,292 B2 | 8/2021 | Malhotra et al. | |
| 11,133,005 B2 | 9/2021 | Aher et al. | |
| 11,170,778 B2* | 11/2021 | Jun | G10L 15/22 |
| 11,328,719 B2* | 5/2022 | Lee | G10L 15/30 |
| 11,677,832 B2* | 6/2023 | Santhar | G10L 15/08 |
| | | | 709/201 |
| 11,809,783 B2* | 11/2023 | Piersol | G10L 15/22 |
| 12,047,194 B2* | 7/2024 | Strutt | G10L 15/22 |
| 2019/0079724 A1* | 3/2019 | Feuz | G06F 40/20 |

(Continued)

OTHER PUBLICATIONS

Vilar,Schroeder,Wada, Bezerra,Heitzmann, Simionato, Cavalcanti, "A Prediction Classifier Architecture to Forecast Device Status on Smart Environments", 2016, IEEE, pp. 001116-001121 (Year: 2016).*

(Continued)

*Primary Examiner* — Paras D Shah
*Assistant Examiner* — Nadira Sultana
(74) *Attorney, Agent, or Firm* — HALEY GUILIANO LLP

(57) ABSTRACT

Systems and methods are described for causing a device to perform an action based on a voice command. Devices connected to a localized network and capable of performing one or more actions based on one or more voice inputs may be identified, and device state information for each of the devices may be determined. The systems and methods may determine, based at least in part on the device state information, a predicted voice command, and a particular device of the plurality of devices for which the predicted voice command is intended. A voice input may be received, and based on receiving the voice input, the particular device may be caused to perform an action related to the predicted voice command.

20 Claims, 14 Drawing Sheets

(56) References Cited

U.S. PATENT DOCUMENTS

2022/0215837 A1* 7/2022 White .................. G10L 15/28
2023/0059372 A1* 2/2023 Decrop ................ G01S 3/8086

OTHER PUBLICATIONS

ElSayed, "Machine Learning in Smart Homes," Sep. 3, 2020 (6 pages) (https://medium.com/swlh/machine-learning-in-smart-homes-5f39e9600cf0).
Google Assistant 'Guacamole' will let you 'snooze' alarms & 'answer' calls without 'Hey Google', Apr. 23, 2021 (5 pages) (https://9to5google.com/2021/04/23/google-assistant-guacamole/).
Johnson et al., "Learning Graph Structure With A Finite-State Automaton Layer," 34th Conference on Neural Informaton Processing Systems (NeurIPS 2020), Vancouver, Canada (12 pages).

* cited by examiner

| Currently Playing Media Asset | James Bond | Cricket Game | None | None | None | None | None | None |
|---|---|---|---|---|---|---|---|---|
| Current Action Being Performed | Playing Action Scene of VOD Movie | Playing Live Sports | None | Making Ice | None | Received Voice Input "it is Loud" | None | Light On |
| Current Settings | Volume Level 40 | Volume Level 50 | Volume Level 20 | Temperature 35 Degrees F | None | Volume Level 8 | Volume Level 4 | No Dim |

PROCESSING VOICE INPUT IN INTEGRATED ENVIRONMENT

BACKGROUND

This disclosure is directed to systems and methods for causing a particular device to perform an action related to a predicted voice command. In particular, based at least in part on device state information, the predicted voice command, and the particular device, may be determined.

SUMMARY

Many users have become accustomed to interacting with digital assistants (e.g., voice-based, text-based, a combination thereof, etc.). For example, a user may request a digital assistant to play music, find local restaurants in his or her area, or provide a weather report. Digital assistants are also becoming an integral part of connected home and home automation solutions. For example, a digital assistant may receive analog voice signals, convert the analog signals into a digital signal, perform speech recognition, perform a web search, infer the intent of the user, and take action or generate a response. The action may be to send a specific command to another connected device or generate an audio or visual response.

However, as more and more devices are able to support voice commands and voice interactions, there are growing concerns among a large segment of users about privacy, particularly when captured voice data is sent by an always-on digital assistant to a cloud or remote server for processing. Moreover, there are costs (e.g., usage of computing resources of service providers and users, financial costs for service providers, and time required to perform processing) associated with accessing cloud services of a service provider. One approach attempts to address privacy concerns by performing processing locally without sending sensitive user data away from the user's home. However, the capacity of such local processing may be limited, e.g., generally only a limited number of voice commands can be processed locally.

Many digital assistants require the user to utter a wake word (e.g., "Hey Siri") in order to activate and interact with the digital assistant. However, the user may forget to utter such wake word when attempting to use the digital assistant, or may be frustrated with having to use such wake word, which detracts from the user experience, at least in part because the usage of a wake word may be unnatural for the user in what is intended to be a simulated conversation. In one approach, a digital assistant on a designated device may provide a limited set of commands that can be processed locally without requiring the usage of a wake word in association with the command. However, in such approach, the set of commands is limited to a specific device and requires a user to manually specify the set of commands for such device.

To overcome these problems, systems and methods are provided herein for identifying a plurality of devices connected to a localized network and capable of performing one or more actions based on one or more voice inputs. The systems and methods may comprise control circuitry configured to determine device state information for each of the plurality of devices. The control circuitry may determine, based at least in part on the device state information, a predicted voice command, and a particular device of the plurality of devices for which the predicted voice command is intended. The control circuitry may receive a voice input, and based on receiving the voice input, cause the particular device to perform an action related to the predicted voice command.

Such aspects may provide a dynamic, flexible system in which device state information is analyzed to determine a predicted voice command for a particular device, even if voice input is not yet received, or is received and does not specify a device or specific command. The provided systems and methods may leverage collective voice processing capabilities of connected devices within an environment (e.g., a home network) and minimize the cost associated with processing voice input (e.g., automatic speech recognition and intent identification). The system may leverage the interconnectivity of disparate voice assistant devices or other devices, and monitor dynamic criteria, such as, for example, device state information of such devices, in a networked environment, to disambiguate or predict voice inputs and/or commands and/or intended devices.

In some embodiments, the system may maintain temporal and local knowledge graphs locally for faster processing. Such knowledge graphs may be built based on compilation and parsing of voice shortcuts associated with connected devices identified in the localized network, and based on received node and connection data, inferred in the cloud based on the device state information (e.g., active device states and/or metadata) related to the identified devices. The knowledge graph may have limited nodes and connections representing recognized words, commands, recognized entities, recognized intent. In some embodiments, the number of nodes of the local knowledge graph may be limited, and the system may continuously update the knowledge graph based on the device state information to minimize the user of computing resources. For example, instead of copying all nodes and connections related to a particular context from the cloud, the system may selectively add specific nodes and connections and otherwise perform updating of the knowledge graph, based on inferences (e.g., prediction of potential commands, and/or comments, and/or instructions and/or intents) made by the cloud server. As another example, the provided systems and methods, in predicting voice commands, may leverage the observation that many commands originating from a particular location (e.g., a home) may have similar phonetics and repeated voice characteristics. The system may improve accuracy and processing speed in recognizing the commands/queries as the system may be trained for a specific set of users having similar phonetics and speech patterns, and/or based on analyzing and performing matching with respect to a more limited set of alternatives.

In some embodiments, voice shortcuts may be dynamically updated based on the present state of the connected devices, e.g., for local and/or remote processing. In some embodiments, the system may perform parsing of voice input and/or voice commands, to decouple device names from the parsed input or command and associate multiple devices to a particular command. In some embodiments, the system may collectively utilize microphones of the connected devices and perform routing of voice data between different devices and/or services. In some embodiments, the system may route voice data to a particular voice assistant device or service in the absence of another voice assistant device or service being available, e.g., based on analyzing profiles of the user and/or devices and/or services. In some embodiments, the system may enable users to avoid wake words, and avoid the requirement that users be descriptive or specific with respect to their voice input, since the system may maintain an updated list of voice shortcuts pertinent to the current device state information. In some embodiments, if a conflict in recognizing an entity emerges with respect to a current voice input, the system can take advantage of a last resolved, or recently resolved, phonetically similar word(s) as reference.

In some embodiments, each of determining the predicted voice command, and determining the particular device, is performed prior to receiving the voice input, and causing the particular device to perform the action related to the predicted voice command is performed in response to determining the received voice input matches or is related to the predicted voice command. At least a portion of the determining of the predicted voice command, and the determining of the particular device, may be performed locally on one or more of the plurality of devices connected to the localized network.

In some aspects of this disclosure, each of determining the predicted voice command, and determining the particular device, is performed in response to receiving the voice input and based at least in part on processing the voice input. At least a portion of the determining of the predicted voice command, the determining of the particular device and the processing of the voice input, may be performed locally on one or more of the plurality of devices connected to the localized network.

In some embodiments, determining the particular device further comprises determining a first candidate device of the plurality of identified devices and a second candidate device of the plurality of identified devices, for which the predicted voice command is intended. Determining the particular device may further comprise determining that a user associated with the voice input is located closer to the first candidate device than the second candidate device, and therefore identifying the first candidate device as the particular device.

In some aspects of this disclosure, determining that the user associated with the voice input is located closer to the first candidate device than the second candidate device is performed based at least in part on wireless signals. Wireless signals may be received over the localized network by networking equipment from the first candidate device, and wireless signals may be received over the localized network by the networking equipment from the second candidate device In some embodiments, each of determining the predicted voice command, and determining the particular device, comprises transmitting the device state information to a server, and receiving from the server an indication of the predicted voice command and an indication of the particular device.

In some aspects of this disclosure, the systems and methods provided herein further comprise generating a knowledge graph comprising a respective node for each of at least a subset of the plurality of identified devices, and updating the knowledge graph to comprise a relationship between a node representing the particular device and a node representing the predicted voice command. The updated knowledge graph may be used to determine the predicted voice command and to determine the particular device. In some embodiments, the knowledge graph may be updated to include a relationship between a node associated with the determined device state information for the particular device and a node representing the predicted voice command. At least a portion of the knowledge graph may be stored locally at one or more of the plurality of devices connected to the localized network.

In some embodiments, the device state information comprises, for each respective device of the plurality of devices, one or more of an indication of whether the device is turned on; an indication of current settings of the device; an indication of voice processing capabilities of the device; an indication of one or more characteristics of the device; an indication of an action previously performed, currently being performed or to be performed by the device; or metadata related to a media asset being played via the device.

In some aspects of this disclosure, the systems and methods provided herein further comprise generating a list comprising a first signature word that is associated with voice inputs for a first device of the plurality of devices, and a second signature word that is associated with voice inputs for a first device of the plurality of devices. The systems and methods may determine, at the first device, that the voice input comprises the second signature word, and in response to determining that the voice input comprises the second signature word, perform processing of the voice input at least in part at the first device.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale.

DETAILED DESCRIPTION

Figure 1:
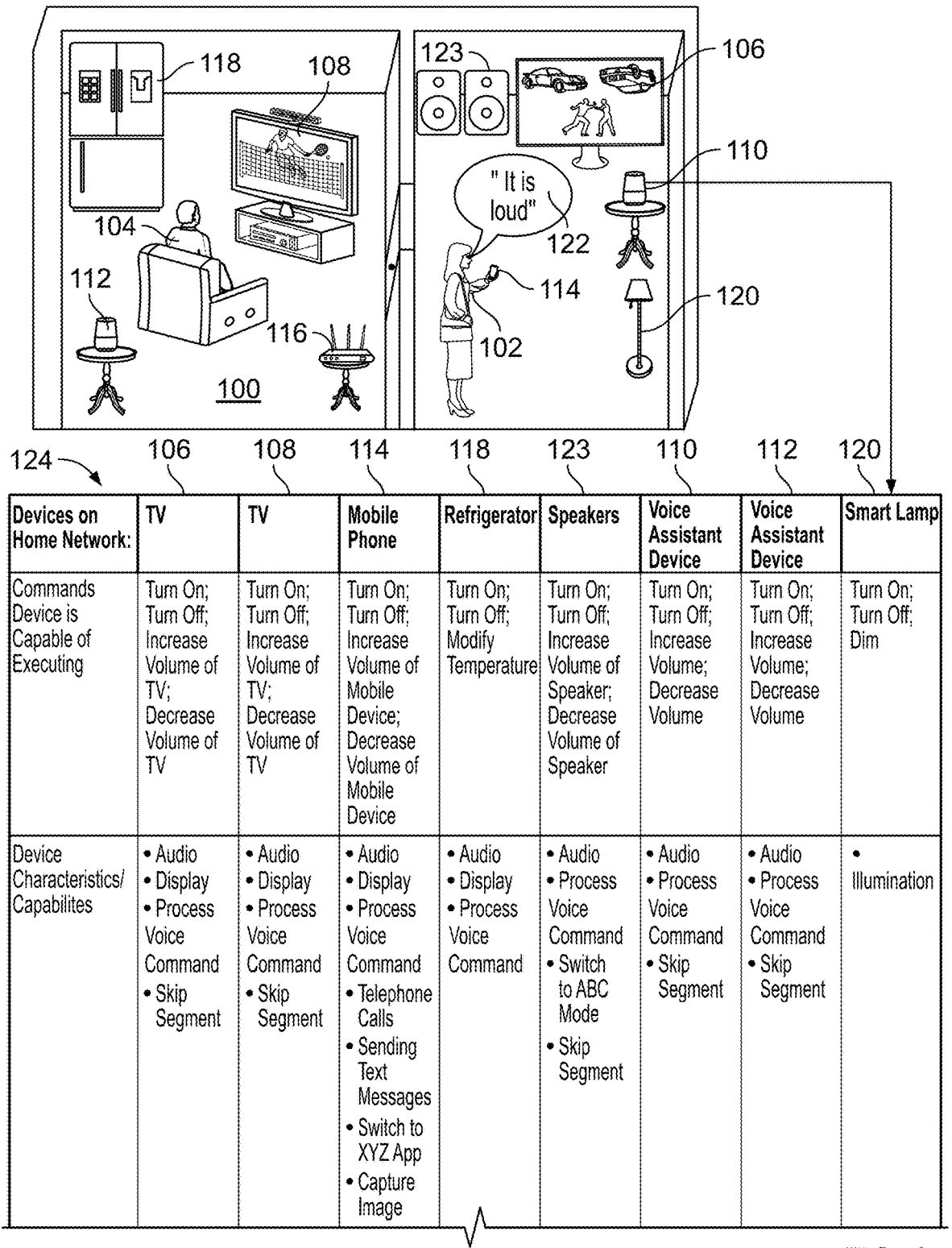
FIG. 1 shows an illustrative environment in which a predicted voice command, and a particular device for which the predicted voice command is intended, may be determined, in accordance with some embodiments of this disclosure.
Figure 1:
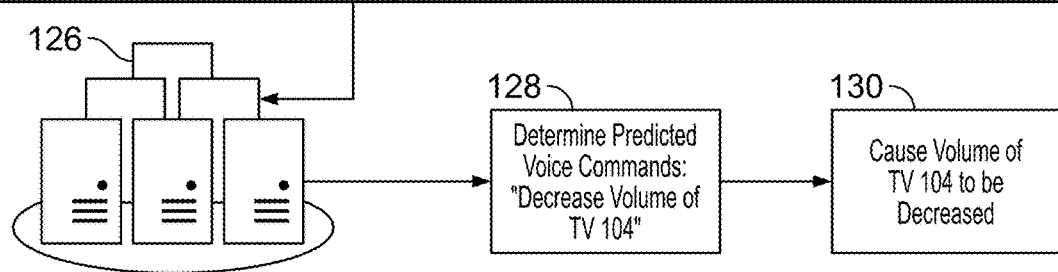

FIG. 1 shows an illustrative environment 100 in which a predicted voice command, and a particular device for which the predicted voice command is intended, may be determined, in accordance with some embodiments of this disclosure. Environment 100 may be a particular physical location (e.g., a household of user 102 and/or user 104, a place of business, an office, a school, an other organization, or any other suitable location, or any combination thereof). Environment 100 may comprise any suitable number and types of computing devices, e.g., smart television 106, 108; digital assistant 110, 112; mobile device 114 (e.g., smartphone, tablet, smart watch, and/or any other suitable mobile device); networking equipment 116; Internet of Things (IoT) devices (e.g., smart refrigerator 118, smart lamp 120, security cameras, and/or any other suitable IoT device); speakers 123; a biometric device; a desktop computer; laptop computer; virtual reality (VR) device; augmented reality (AR) device; and/or any other suitable device(s). In some embodiments, at least some of such devices may be configured to be connected to a localized network (e.g., a home network, a business network, etc., facilitated at least in part by networking equipment 116) and may be capable of receiving and processing voice inputs and/or voice commands and/or voice queries.

The computing devices of environment 100 may be configured to be connected to a network over which voice inputs and/or voice commands and/or voice queries may be received and subsequently processed. For example, such devices may be equipped with microphones and suitable circuitry to receive and process speech or voice input received from user 102 and/or user 104 and/or any other suitable user and/or transmitted via any suitable device. In some embodiments, the computing devices in environment 100 may be equipped with antennas for transmitting and receiving electromagnetic signals at frequencies within the electromagnetic spectrum, e.g., radio frequencies, to communicate over a network in environment 100. The network may correspond to, e.g., a Wi-Fi network, such as, for example, 802.11n, 802.11ac, 802.11ax, or Wi-Gig/802.11ad. The devices of environment 100 may communicate wirelessly over a wireless local area network (WLAN) and with the Internet, and may be present within an effective coverage area of the localized network. The Internet may include a global system of interconnected computer networks and devices employing common communication protocols, e.g., the transmission control protocol (TCP), user datagram protocol (UDP) and the Internet protocol (IP) in the TCP/IP Internet protocol suite. In some embodiments, the devices of environment 100 may additionally or alternatively be configured to communicate via a short-range wired or wireless communication technique (e.g., Bluetooth, RFID, NFC, or any other suitable technique, or any combination thereof).

Networking equipment 116 may comprise a router, configured to forward data packets from the Internet connection, received by way of a modem, to devices within the localized network of environment 100 and receive data packets from such devices. In some embodiments, networking equipment 116 may include a built-in modem to provide access to the Internet for the household (e.g., received by way of cable or fiber connections of a telecommunications network) In some embodiments, networking equipment 116 may include built-in switches or hubs to deliver data packets to the appropriate devices within the Wi-Fi network, and/or built-in access points to enable devices to wirelessly connect to the Wi-Fi network, and/or environment 100 may include one or more stand-alone modems, switches, routers, access points and/or mesh access points. In some embodiments, media asset(s) may be provided to user 102 and/or user 104 via any suitable device, by way of wireless signals transmitted through the localized network, and/or responses to voice inputs or any other data related to voice inputs may be provided via the network. As referred to herein, the term "media asset" should be understood to refer to an electronically consumable user asset, e.g., television programming, as well as pay-per-view programs, on-demand programs (as in video-on-demand (VOD) systems), Internet content (e.g., streaming content, downloadable content, webcasts, etc.), augmented reality content, virtual reality content, video clips, audio, playlists, websites, articles, electronic books, blogs, social media, applications, games, and/or any other media or multimedia, and/or combination of the above.

Figure 2:
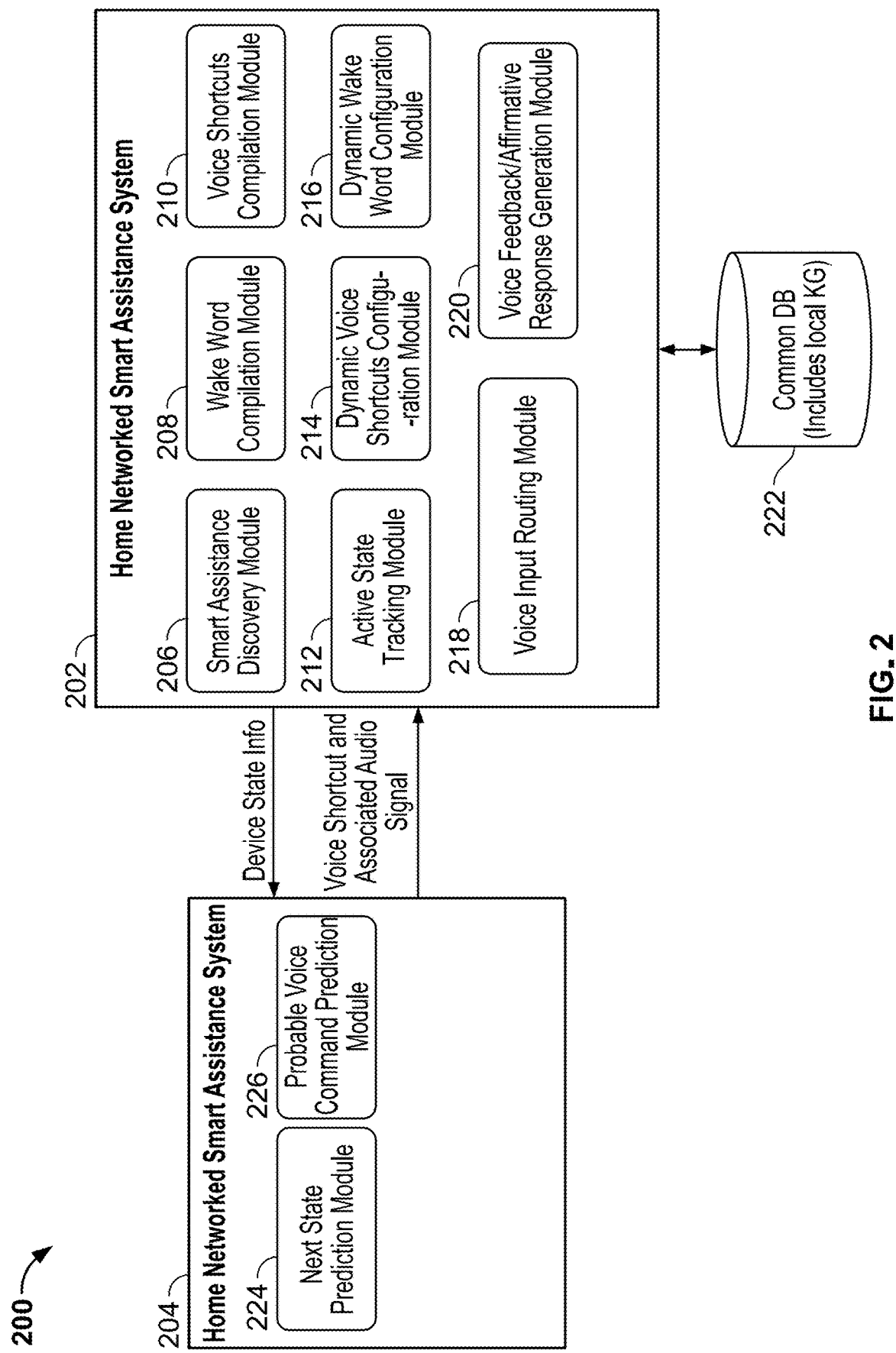
FIG. 2 shows an illustrative block diagram of a system for determining a predicted voice command, and a particular device for which the predicted voice command is intended, in accordance with some embodiments of this disclosure.

FIG. 2 shows an illustrative block diagram of a system 200 for determining a predicted voice command, and a particular device for which the predicted voice command is intended, in accordance with some embodiments of this disclosure. In some embodiments, a voice processing application (e.g., executing at least in part on one or more of the network-connected computing devices of environment 100 and/or one or more remote servers 126 of FIG. 1) may be configured to perform the functionalities described herein. In some embodiments, the voice processing system may be offered as an add-on application, e.g., installed on any home gateway, mobile device, or central device of the home, and/or certain functionalities provided by the voice processing application may be provided via an Application Programming Interface (API).

In some embodiments, the voice processing application may be executable to implement home networked smart assistance system 202 and home networked smart assistance system 204 and each of the modules included therein. System 202 may be implemented locally within environment 100 (and/or at one or more remote servers 126), and system 204 may be implemented at one or more servers 126 located at a remote location from environment 100 (and/or locally within environment 100). System 202 may comprise smart assistance discovery module 206, wake word compilation module 208, voice shortcuts compilation module 210, active state tracking module 212, dynamic voice shortcuts configuration module 214, dynamic wake word configuration module 216, voice input routing module 218, voice feedback/affirmative response generation module 220, and/or any other suitable modules, and/or may include or otherwise be in communication with common database 222 which may store one or more knowledge graphs and/or any other suitable data. System 202 may comprise prediction module 224, probable voice command prediction module 226 and/or any other suitable modules, and/or may include or otherwise be in communication with common database 222.

Smart assistance discovery module 206 may be configured to discover devices in environment 100 (e.g., connected to a home network) using simple service discovery protocol (SSDP) techniques and/or any other suitable technique. In some embodiments, smart assistance discovery module 206 may discover all connected devices in environment 100 having a voice assistant feature. As an example, the voice processing application, e.g., running at least in part on networking equipment 116 and/or any other suitable device in environment 100, may request and/or scan for data packets to discover other devices (e.g., smart televisions 106, 108 and/or voice assistants 110, 112, etc.) on the localized network of environment 100. In some embodiments, the voice processing application may be configured to discover the presence of devices on the wireless network with specific capabilities (e.g., voice command processing capabilities and/or the capability of performing an action in response to another device's processing of voice input). In some embodiments, the voice command capability of the device, and/or other device capabilities or device characteristics, can be broadcast for discovery as part of the service description of the device, e.g., over any suitable wireless network or short-range communication path or wired communication path. In some embodiments, the voice processing application may continuously or periodically (e.g., at predefined intervals) perform scanning for connected devices and their associated voice command and/or voice input and/or voice query processing capabilities, and/or may do so in response to a triggering event (e.g., receiving user input).

Wake word compilation module 208 may be configured to compile a list of signature words or wake words configured for particular connected devices in environment 100. For example, module 208 may query each device in environment 100 or otherwise receive data (e.g., from each device or other information source) indicating whether a particular device is associated with a wake term or signature term and if so, an indication of such wake term. As an example, wake terms or signature terms for a Google voice assistant device may be "Hey Google" and a wake terms or signature terms for an Amazon voice assistant device may be "Alexa." In some embodiments, the list of signature words or wake words may be stored at one or more devices local to environment 100, and/or at remote server 126 and/or any other suitable database (e.g., common database 222).

Connected device active state tracking module 212 may be configured to collect and monitor active device state information of the connected devices in environment 100, e.g., discovered by way of module 206. In some embodiments, module 206 may receive such device state information, e.g., as part of the discovery process. In some embodiments, the device state information may comprise an indication of whether a particular device is turned on or off; an indication of voice processing capabilities of a particular device; an indication of device settings of a particular device; an indication of one or more characteristics of a particular device; an indication of an action previously performed, currently being performed or to be performed by a particular device; metadata related to a media asset being played via the device, and/or any other suitable device state information and/or metadata associated with discovered devices of environment 100. The voice processing application may be configured to generate data structure 124, e.g., in a tabular format, and/or any other suitable format, based on data requested and/or received from the devices of environment 100 and/or data received from any suitable information source. For example, the video processing application may cause devices in environment 100 to transmit, to a local centralized location and/or a remote server, an indication of a type of the device (e.g., including a device identifier, which may be a descriptive attribute such as, for example, at least one of the device name, device type, model number, serial number, manufacturer name, battery life, etc.), and device capabilities and/or commands that the devices are capable of executing, as shown in data structure 124, may be determined from such information.

Data structure 124 may comprise an identifier for each detected device in environment 100 or a subset of the devices, and an indication of associated device state information for each device or a subset of the devices. For example, data structure 124 may indicate that TV 106 is capable of executing actions based on various voice commands or other types of commands (e.g., Turn on; Turn off; Increase volume, Decrease volume). Data structure 124 may specify that TV 106 has audio and display capabilities, the ability to process voice input, the ability to skip segments of a media asset, and/or any other suitable capabilities. Data structure 124 may indicate that a media asset currently being provided to user 102 is a James Bond VOD movie being played at a particular volume level, the particular scene being played is an action scene, and/or any other suitable settings of TV 106 (e.g., brightness, battery life, any suitable audio or display settings, trick-play settings, etc.).

Figure 3:
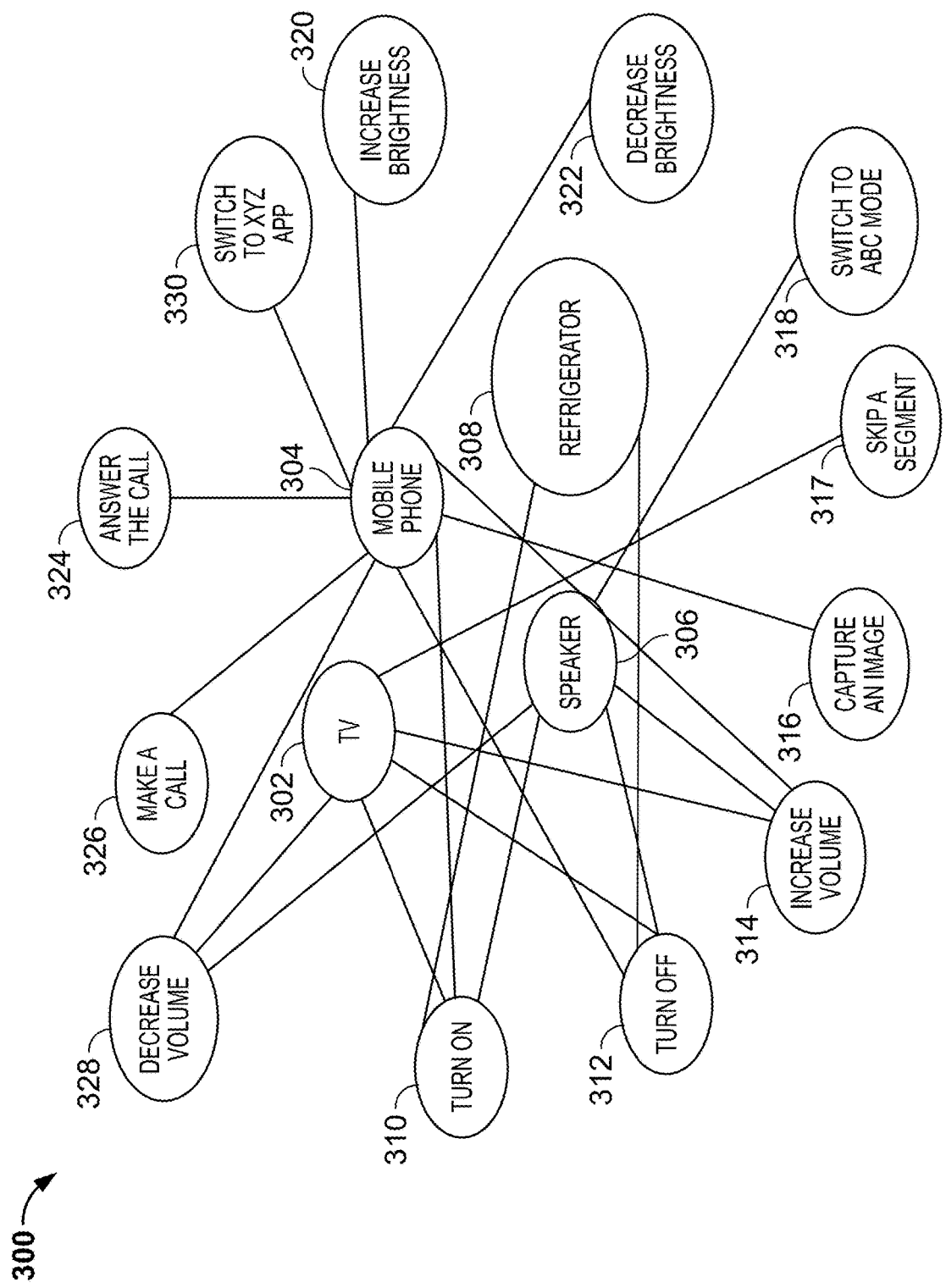
FIG. 3 shows an illustrative knowledge graph, in accordance with some embodiments of this disclosure.

FIG. 3 shows an illustrative knowledge graph, in accordance with some embodiments of this disclosure. In some embodiments, the voice processing application may be configured to generate one or more knowledge graphs, such as, for example, knowledge graph 300, based at least in part on the device state information of data structure 124. Knowledge graph 300 may comprise nodes for each device, or a subset of the devices, of environment 100, e.g., discovered by way of smart assistance discovery module 206 and confirmed as having voice processing capabilities. In some embodiments, at least a portion of knowledge graph 300 may be stored at one or more devices local to environment 100, and/or at remote server 126 and/or any other suitable database (e.g., common database 222). In some embodiments, knowledge graph 300, and/or any of the knowledge graphs disclosed herein, may be used in conjunction with one or more machine models and/or any other suitable computer-implemented applications or techniques.

In some embodiments, one or more of the knowledge graphs disclosed herein may be a knowledge graph locally stored at environment 100 and may comprise a limited number of nodes based on parsing a compilation of voice shortcuts of connected devices of environment 100. Such voice shortcuts, and/or other nodes and relationships between nodes, may be determined based upon receiving an indication of nodes and connections inferred (e.g., at remote server 126 in the cloud), based at least in part on the device state information (e.g., active device state and/or metadata). For example, if a particular device is determined to be turned on and/or user 102 is determined to be proximate to such device, the knowledge graph may be caused to include a node representing the particular device and one or more nodes for respective voice commands such device is capable of processing or otherwise performing an action based on. In some embodiments, one or more of the knowledge graphs disclosed herein may selectively include nodes and connections representing recognized words, commands, recognized entities, recognized intent, etc. In some embodiments, the voice processing system may be configured to continuously update (e.g., add or remove nodes and relationships between nodes) the one or more knowledge graphs based on the active states of devices indicated in the device state information, such as shown at data structure 124.

Knowledge graph 300 may comprise node 302 representing smart TV 106; node 304 representing mobile device 114; node 306 representing speaker 123; node 308 representing smart refrigerator 118 and/or a node for each identified device of environment 100 capable of processing, and/or otherwise performing actions based on, voice inputs. Knowledge graph 300 may further comprise nodes representing predicted or received voice commands that the devices of environment 100 are determined to be capable of. For example, the voice processing application may implement voice shortcuts compilation module 210, which may be configured to compile a list of predicted or received voice commands, such as, for example, including quick tasks and/or voice shortcuts supported by the connected devices of environment 100. In some embodiments, voice shortcuts compilation module 210 may pull, request or otherwise receive a list of recognized voice shortcuts and/or commands and/or queries that each of the discovered devices of environment 100 can process. In some embodiments, specific permissions may be granted by connected devices to enable the voice processing application to access such voice commands, and optionally audio samples of such voice commands and/or keywords associated with such voice commands may be provided, e.g., to enable performing keyword spotting locally. Such accessed voice commands, such as, for example, including quick tasks and/or voice shortcuts, may be parsed and used to build knowledge graph 300, which may be used for processing voice inputs, queries or commands (locally and/or remotely) to identify intents and target devices for voice inputs.

Module 210 may parse audio of previously received or otherwise accessed voice inputs (and optionally text associated with the audio), to cause knowledge graph 300 to include nodes for such voice inputs and/or nodes for voice commands corresponding to such inputs and/or nodes for particular devices and/or device state information corresponding to such inputs. In some embodiments, nodes for particular voice commands from among the accessed voice commands may be selectively added to knowledge graph 300 in connection with nodes for one or more devices in environment 100, based on the current device state information. This may be performed in response to a determination that the current device state information suggests that voice input matching or related to such voice command(s), and requesting the identified one or more devices to perform an action, is likely to be received or has been received. In some embodiments, for voice-to-text, i.e., ASR, conversion, the voice processing application can use common voice samples for keyword spotting with respect to a received voice input 122 and use the knowledge graph for inferring a context of a predicted or received voice input. In some embodiments, the compiled list of voice commands and/or quick tasks and/or voice shortcuts may be stored at one or more devices local to environment 100, and/or at remote server 126 and/or any other suitable database (e.g., common database 222).

In some embodiments, based on voice command information obtained by voice shortcuts compilation module 210, knowledge graph 300 may be generated to include node 310 representing a "Turn on" predicted or received voice command associated with smart TV 106. In such example, an edge between node 302 representing smart TV 106 and node 310 may indicate a relationship between node 302 and node 310. In some embodiments, relatedness between nodes may be a function of connections between nodes, a distance between the nodes, and/or a weight assigned to a connection between nodes. Knowledge graph 300 may further include node 312 representing a "Turn off" predicted or received voice command associated with smart TV 106, where node 302 for smart TV 106 shares an edge with node 312. Knowledge graph 300 may further include nodes 314 and 317, representing an "Increase volume" predicted or received voice command and a "Skip a segment" predicted or received voice command, respectively, each sharing an edge with node 302 for smart TV 106. Knowledge graph 300 may further include node 328 for representing a predicted or received "Decrease volume" voice command sharing an edge with node 302 representing smart TV 106.

Knowledge graph 300 may further indicate a relationship between each of node 306 representing speakers 123 of environment 100, node 310, node 312, node 314, node 318 of "Switch to ABC mode," and node 328. Knowledge graph 300 may further indicate a relationship between node 308 representing smart refrigerator 118 of environment 100 and each of node 310 and node 312. Knowledge graph 300 may further indicate a relationship between node 304 representing mobile device 114 and each of node 310; node 312; node 314; node 316 of the predicted or received voice command to "Capture an image"; node 320 of the predicted or received voice command "Increase brightness"; node 322 of the predicted or received voice command "Decrease brightness"; node 324 representing a predicted or received voice command to "Answer the call"; node 326 of the predicted or received voice command to "Make a call"; node 328; and node 330 for the predicted or received "Switch to XYZ app" voice command. In some embodiments, the absence of an edge between two nodes of knowledge graph 300 may denote that no association between such nodes exists. In some embodiments, an edge between two entities in knowledge graph 300 may be associated with a weight (e.g., a real number, which may be normalized to a predefined interval) that reflects how likely the nodes connected by the edge are to be associated in a given context. For example, a relatively high weight may serve as an indication that there is a strong link between the nodes connected by the edge. Conversely, a relatively low weight may indicate that there is a weak association between the nodes connected by the edge.

In some embodiments, next state prediction module 224 of system 204 may be configured to predict an N number of states (e.g., finite states) for each of the connected devices of environment 100. In some embodiments, probable voice command prediction module 226 of system 204 may be configured to predict probable commands, instructions and/or comments that a user can issue based on a last active state of the device. Module 224 and/or module 226 can be a cloud-based service (e.g., implemented at one or more servers 126), and/or may be implemented locally, to receive device state information and/or metadata from connected devices in environment 100. In some embodiments, system 204 may determine, and transmit to one or more devices of environment 100, frequently used text and/or a voice sample and/or associated text and/or intents for the predicted voice commands and/or predicted instructions and/or predicted comments, e.g., determined based on device state information. Such information may be stored at, e.g., database 222. Module 224 may implement any suitable computer-implemented technique, e.g., a finite state machine (FSM), heuristic-based techniques, and/or machine learning techniques, to efficiently predict next states that the device(s) can take. In some embodiments, the FSM may be built based on previous inferences that the voice processing application may have made. In some embodiments, for devices and/or states that may not have a finite set of outcomes, the system may employ advanced automation logic, e.g., a machine learning engine, to predict the next states.

In some embodiments, for each state, probable command or instruction prediction module 226 can predict a limited set of commands, instructions and/or comments that can be used by dynamic voice shortcuts configuration module 214 to dynamically update the list of voice shortcuts. For example, system 202 (e.g., module 214) may receive, from the cloud service which may be implemented by way of system 204, audio samples associated with the predicted voice commands, to enable the local performance of voice-to-text conversion of the audio samples, and keyword spotting. In some embodiments, system 202 may receive entity and connection details, e.g., from cloud server 126, and update knowledge graph 300 (e.g., locally and/or remotely stored) based on such entity and connection details, e.g., an indication of a specified relationship between "It is loud" and "Decrease volume." A locally stored knowledge graph (e.g., hosted at devices of environment 100 and/or common database 222 of FIG. 2) may be updated with a final predicted inference 128 made by the voice processing application, with or without including intermediate nodes used to infer such inference in the update. The updated knowledge graph may include new connections and nodes (e.g., an edge connection between nodes "Decrease volume" 328 and "It is loud" 402 of FIG. 4) to be added, thereby reflecting the logic and mapping carried out in association with analyzing voice input 122. In some embodiments, the voice processing application may infer potential user voice commands and/or comments and/or intents based on a history of enunciation associated with the predicted states of a device. In some embodiments, there may be multiple expressions of intent that map to a same predicted state of a device. In some embodiments, the voice processing application may be configured to perform the prediction of a voice command at 128, and the collection and/or transmission of device state information, prior to receiving voice input 122, to facilitate processing of voice input 122 upon its receipt. In some embodiments, the voice processing application may be configured to perform the prediction of a voice command at 128, and the collection and/or transmission of device state information, in response to receiving voice input 122. In such an instance voice, input 122 and/or the device state information may be provided to server 126 together with the device state information to facilitate the prediction, or otherwise processed locally to facilitate the prediction. In some embodiments, the intent of the conversational session may be stored temporally, and on additional speech input, the system may refer to attempt to resolve queries locally and/or remotely. The voice processing application may be configured to automatically update routing logic of the received or predicted voice input or voice command based on the identification of the appropriate device.

Upon receiving the last active state and/or predicted states of the one or more discovered devices of environment 100, module 226 can use any suitable computer-implemented technique, e.g., a machine learning model (e.g., an artificial neural network and/or any other suitable machine learning model) to predict probable commands, instructions and/or comments. In some embodiments, server 126 may determine and provide audio samples, e.g., associated with the predicted probable voice command, that can be stored locally in a home environment 100, and used for keyword spotting. Module 226 may be configured to predict user comments, e.g., the voice command at 128, based at least in part on past observations, and/or based at least in part on received device state information (e.g., active device status and metadata) from environment 100. For example, module 226 may receive metadata indicating that a current scene of a media asset, or the media asset itself, played via TV 106 has certain characteristics (e.g., an action or fight scene or genre) and/or that TV 106 is set at a particular volume (e.g., above a threshold), and/or that user 102 is proximate to TV 106 and/or any other suitable information. As another example, the voice processing application may perform audiovisual processing of a current scene to identify certain characteristics, e.g., the occurrence of fast-paced movement of objects or actors and/or audio above a certain threshold, to determine the scene is likely loud. Based on such factors, the voice processing application may determine a predicted voice comment or input of "It is loud" and/or a predicted voice command of "Decrease volume" and that such predicted voice input and/or command relates to TV 106. Server 126 may transmit such information to one or more devices of environment 100 and/or common database 222. Based on such information, a knowledge graph 400 of FIG. 4 may be caused to add a new node 402 for the predicted "It is loud" voice input with an edge connection (e.g., direct or indirect) to node 328 for the predicted "Decrease volume" voice command. In some embodiments, dynamic voice shortcuts configuration module 214 may be configured to update a list of voice shortcuts based on the device state information and/or information or instructions received from system 204. For example, in response to receiving the predicted voice commands and/or other predicted voice input, module 214 may be configured to delete a least used and/or oldest voice shortcut, and/or another shortcut that is determined to be unrelated to the received predictions. In some embodiments, an instruction to update a weight of specific connections of a local knowledge graph can be sent from the cloud service based on context resolved in the cloud.

Figure 4:
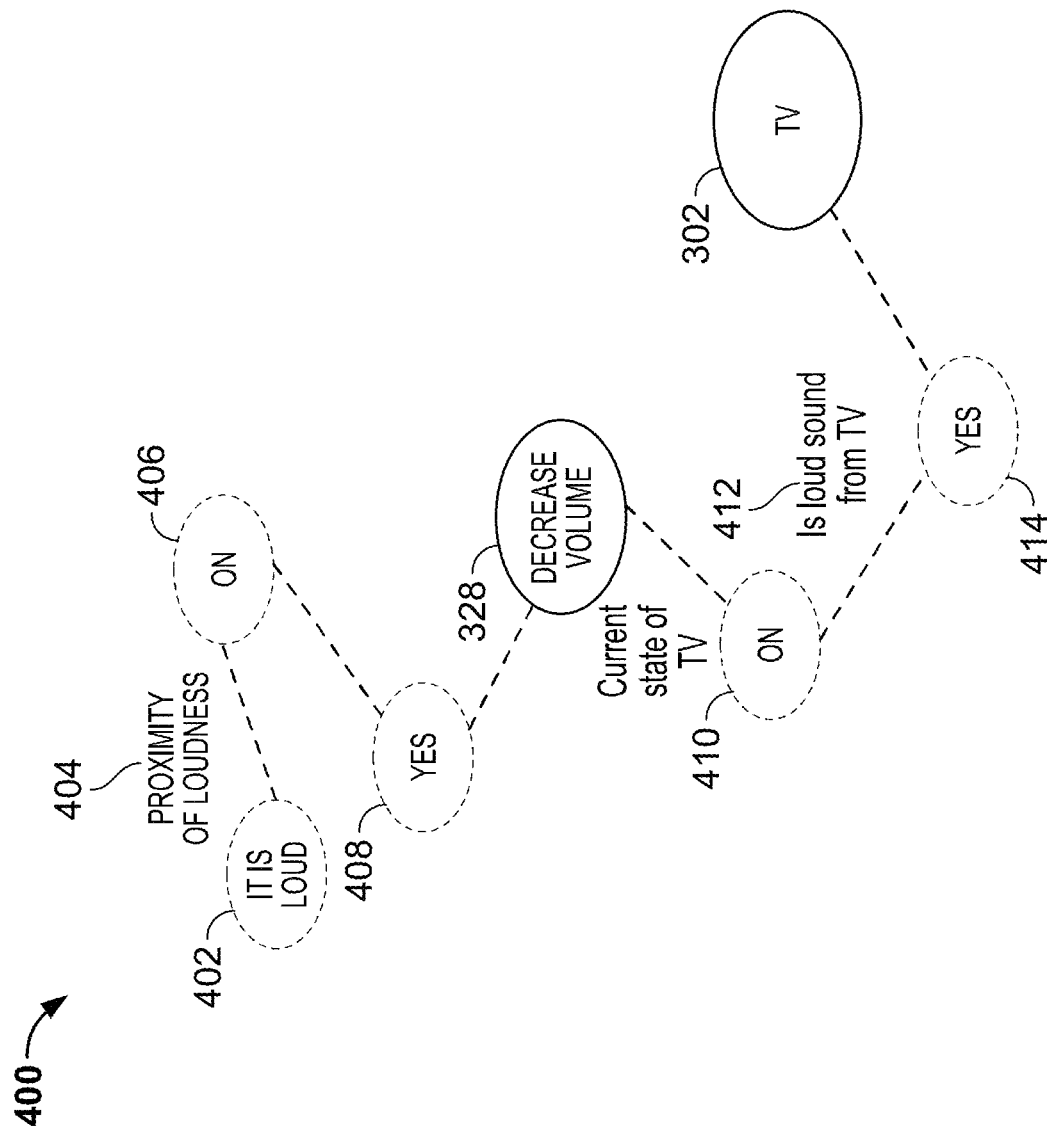
FIG. 4 shows an illustrative knowledge graph, in accordance with some embodiments of this disclosure.

FIG. 4 shows an illustrative knowledge graph 400, in accordance with some embodiments of this disclosure. The voice processing application may receive voice input 122 and parse such input in real time, e.g., using the updated locally stored knowledge graph 400, as an alternative to communicating voice input 122 to cloud servers for processing. Such features may be beneficial in terms of minimizing the use of computing resources, e.g., by performing keyword spotting locally as opposed to by natural language techniques at a remote server, and may be desirable from a privacy perspective of a user. For example, when voice input 122 is received, the voice processing application may refer to the local database for keyword spotting and refer to the local knowledge graph for recognized words and entities, and reconstruct the intent by correlating terms and entities.

Knowledge graph 400 may be populated with nodes and relationships between received device state information and/or received predicted voice inputs. Knowledge graph 400 may be used to determine that received voice input or voice command 122 matches or is otherwise related to predicted voice inputs and/or commands, e.g., as predicted by module 226 of FIG. 2 and as shown at node 402 and node 328 of FIG. 4. Knowledge graph 400 may comprise node 402 representing a predicted voice input, e.g., predicted by module 226 of FIG. 2. Node 402 may be linked to node 328 based at least in part on the aforementioned analysis of device state information and/or other contextual information of environment 100, such as, for example, a location of user 102. Alternatively, node 402 may represent received voice input 122 itself.

For example, the location of user 102 with respect to two or more candidate devices may be taken into account, and may be used to determine which candidate device should be ranked as a more likely device intended by voice input 122. The voice processing application may determine (e.g., based on network traffic data of networking equipment 116) that multiple devices are streaming content, and that the predicted or received voice input does not specify a particular device to which action should be taken. The voice processing application can identify based on the last state and predicted states of the connected device, to which device the voice command should apply. If the voice processing application determines that user 102 is within a same room or closer to smart TV 106 than smart TV 108, such determination may weigh towards a finding that smart TV 106 is the more likely subject of a predicted or received voice command or voice input than smart TV 108. As another example, the voice processing application may collect device state information from connected devices, correlate such information with resolved intent, and perform an action and/or generate a voice command prediction, based on such information, even if a device name is not specified in the input. For example, for a predicted or receive voice command of "Alexa turn off the notification," the voice processing application may determine that a notification has been generated for display on a particular device, and thus a received or predicted voice command should relate to such device. The system may additionally or alternatively consider parameters, e.g., user proximity to a device, correlation score, etc., to identify which device the predicted query or command or instruction relates to. For example, for a received or predicted command of "Turn off the notification," the system can identify which device is close to the user, check if the instruction is suitable for that device and take action on the closest device only when the action is suitable for the closest device or pass it on the command for performance at a next closest suitable device. If, for a particular command, two or more devices are determined to be associated with the command, the voice processing application may cause such command to be executed on the device having a predicted state determined to be most closely associated with the command.

Locations of users and/or connected devices within environment 100 may be determined using any suitable technique. In some embodiments, a location of user 102 may be ascertained based on a location of a user device (e.g., mobile device 114, a smartwatch, etc.) associated with user 102, based on location data, e.g., using any suitable technique, such as, for example, GPS techniques, VPS techniques, analyzing wireless signal characteristics, determining that a voice command was received from the user at a voice assistant located in a particular room, or any other suitable technique or any combination thereof. In some embodiments, the voice processing application may identify locations of users and/or devices in environment 100 based on determined wireless signal characteristics, e.g., channel state information (CSI), received signal strength indicator (RSSI) and/or received channel power indicator (RCPI), as discussed in more detail in Doken et al., application Ser. No. 17/481,931, the contents of which are hereby incorporated by reference herein in their entirety. In some embodiments, the device state information may specify a location of a connected device, and/or user input may be received specifying a particular device.

In some embodiments, the voice processing system may determine a location of user 102 and/or the connected devices within environment 100, and/or build a map of such devices and/or users, based on sensor data (e.g., by performing image processing techniques on images captured by one or more of the connected devices and/or one or more cameras positioned at various locations in environment 100; by processing audio signals captured by a microphone of a user device; processing data from IoT devices and indicating a location of a user or device; by using ultrasonic sensors, radar sensors, LED sensors, or LIDAR sensors to detect locations of users and/or devices, or using any other suitable sensor data or any combination thereof), or using any other suitable technique or any combination thereof. The voice processing application may determine that a user is proximate (e.g., within a threshold distance) to a connected device based on comparing the current location of user 102 to a stored or determined location of each respective connected device in environment 100. In some embodiments, a Cartesian coordinate plane may be used to identify a position of a device or user in environment 100, with the position recorded as (X, Y) coordinates on the plane. The coordinates may include a coordinate in the Z-axis, to identify the position of each identified object in 3D space, based on images captured using 3D sensors and any other suitable depth-sensing technology. In some embodiments, coordinates may be normalized to allow for comparison to coordinates stored at the database in association with corresponding objects. As an example, the voice processing application may specify that an origin of the coordinate system is considered to be a corner of a room within or corresponding to environment 100, and the position of a connected device or user may correspond to the coordinates of the center of the object or one or more other portions of the object.

As shown by intermediate nodes 406 and 408, the voice processing application may determine that user 102 is proximate to a portion of environment 100 associated with loud sounds (e.g., above a threshold decibel level, or above decibel levels of other portions of environment 100), as shown by edge 404, and/or that a source of the loud sounds is a device coupled to assistant 110. The voice processing application may further determine, based on the device state information for the plurality of devices in environment 100, one or more candidate devices that may pertain to voice input 122 and the inferred command "Decrease volume" represented by node 328. For example, the voice processing application may rule out (e.g., remove from the knowledge graph) devices in environment 100 for which the device state information indicates the device is off, lacks the ability to play audio, has a current volume level below a threshold, and/or is associated with a location in environment 100 that is not proximate to user 102.

Node 410 may represent the inference that the device must be on in order to be loud, and edge 412 and node 414 may indicate that a loud sound is coming from a particular smart TV 106 represented by node 302. Thus, node 402 may be mapped to inferred command "Decrease volume" represented by node 328 as well as node 302 representing smart TV 106 for which voice input 122 and/or predicted voice input is determined as likely to be intended.

In some embodiments, certain attributes of the media asset playing at smart TV 106 and indicated by the device state information, e.g., a current scene is an action scene that is likely to be loud, may be taken into account in identifying smart TV 106 as a top-ranked candidate device for a particular determined voice command, as shown at 128 of FIG. 1.

At 130, the voice processing application may cause an action associated with the predicted voice command determined at 128 to be performed. For example, voice assistant 110 may transmit an instruction to smart TV 106 to decrease a volume of a currently playing media asset, based on voice command 128, e.g., determined locally or at server 126. In some embodiments, smart television 106 may receive such instruction from server 126 (e.g., via networking equipment 116) or from any other suitable device within or external to environment 100. In some embodiments, the voice processing application, in processing the determined intended voice command at 128 and causing the volume of TV 106 to be decreased at 130, may convert text associated with the voice command to speech, e.g., to generate for output an audio notification indicating that the volume of TV 106 has been decreased. For example, voice feedback/affirmative response generation module 220 may be configured to generate an affirmative response indicating on which device action will be taken, e.g., for a voice command "Turn off the alarm output audio," the response of "Turning off the mobile device [114] alert". Additionally or alternatively, the voice processing application may provide a textual indication to notify user 102 that the volume of TV 106 has been decreased.

In some embodiments, if voice input 122 is determined not to match and not to be related to the predicted voice inputs, and/or is determined to be ambiguous as to which device it is referring to, voice input 122 may be forwarded to server 126 for further processing, or it may be further processed locally. In some embodiments, voice input 122 may be provided, or may not be provided, to server 126. In some embodiments, at least a portion of the processing of voice input 122 may be performed locally. For example, digital assistant device 110 may receive and digitize voice input 122 received via a microphone of digital assistant device 110 in analog form, and/or may perform parsing of voice input 122. For example, the voice processing application running at digital assistant device 110 and/or any other suitable local device and/or server 126 may be configured to perform automatic speech recognition (ASR) on voice input 122 to convert "It is loud" from audio format to textual format and/or any other suitable processing of voice input 122.

The voice processing application may be configured to transcribe voice input 122 into a string of text using any suitable ASR technique. For example, to interpret received voice input 122, one or more machine learning models may be employed, e.g., recurrent neural networks, bidirectional recurrent neural networks, LSTM-RNN models, encoder-decoder models, transformers, conditional random fields (CRF) models, and/or any other suitable model(s). Such one or more models may be trained to take as input labeled audio files or utterances, and output one or more candidate transcriptions of the audio file or utterance. In some embodiments, the voice processing application may pre-process the received audio input for input into the neural network, e.g., to filter out background noise and/or normalize the signal, or such processing may be performed by the neural network. In some embodiments, in generating the candidate transcriptions, the voice processing application may analyze the received audio signal to identify phonemes (i.e., distinguishing units of sound within a term) within the signal, and utilize statistical probability techniques to determine most likely next phonemes in the received query. For example, the neural network may be trained on a large vocabulary of words, to enable the model to recognize common language patterns and aid in the ability to identify candidate transcriptions of voice input. Additionally or alternatively, transcription of the audio signal may be achieved by external transcription services (e.g., Amazon Transcribe by Amazon, Inc. of Seattle, WA and Google Speech-to-Text by Google, Inc. of Mountain View, CA). The transcription of audio is discussed in more detail in U.S. patent application Ser. No. 16/397,004, filed Apr. 29, 2019, which is hereby incorporated by reference herein in its entirety.

The voice processing application may further employ natural language processing (NLP) including natural language understanding (NLU), e.g., tokenization of the string of voice input 122, stemming and lemmatization techniques, parts of speech tagging, domain classification, intent classification and named entity recognition with respect to voice input 122. In some embodiments, rule-based NLP techniques or algorithms may be employed to parse text included in voice input 122. For example, NLP circuitry or other linguistic analysis circuitry may apply linguistic, sentiment, and grammar rules to tokenize words from a text string, and may perform chunking of the query, which may employ different techniques, e.g., N-gram extraction, skip gram, and/or edge gram; identify parts of speech (i.e., noun, verb, pronoun, preposition, adverb, adjective, conjunction, participle, article); perform named entity recognition; and identify phrases, sentences, proper nouns, or other linguistic features of the text string. In some embodiments, statistical natural language processing techniques may be employed. In some embodiments, a knowledge graph may be employed to discern relationships among entities. In some embodiments, one or more machine learning models may be utilized to categorize one or more intents of voice input 122. In some embodiments, the NLP system may employ a slot-based filling pipeline technique and templates to discern an intent of a query. For example, the voice processing application may reference a collection of predetermined template queries having empty slots to be filled. In some embodiments, the predetermined templates may be utilized in association with a knowledge graph to determine relationships between terms of a query.

Figure 5:
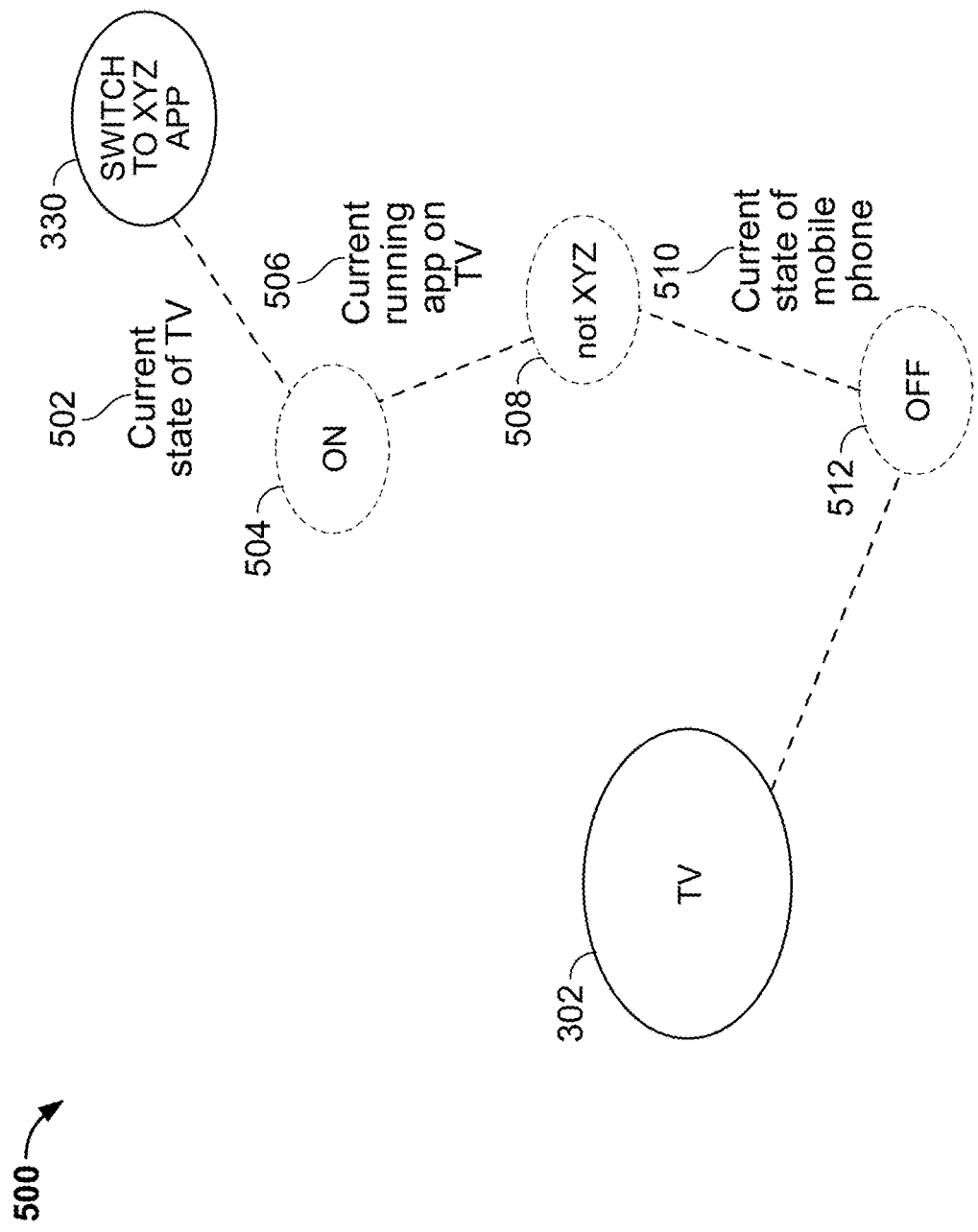
FIG. 5 shows an illustrative knowledge graph, in accordance with some embodiments of this disclosure.

FIG. 5 shows an illustrative knowledge graph 500, in accordance with some embodiments of this disclosure. In the example of FIG. 5, node 330 may represent a received or predicted voice command of "Switch to XYZ App." Based at least in part on the device state information, the voice processing application may determine that a smart TV, e.g., smart TV 106 represented by node 302, is intended by the received or predicted voice command of "Switch to XYZ App" represented by node 330. For example, node 330 may be connected, via edge 502 representing the current state of TV 106, to intermediate node 504 representing an indication that TV 106 is currently on. Knowledge graph 500 may further comprise intermediate node 508, indicating a current app running on TV 106 is not the XYZ app specified at node 330, via edge 506 representing a state of TV 106 with respect to an application running on TV 106. The device state information may indicate that mobile device 114 is capable of executing the XYZ app, but that mobile device 114 is currently off, as indicated by intermediate node 512 and edge 510 of knowledge graph 500, and thus node 302 representing TV 106 may be connected to node 330 by way of intermediate nodes 512, 508, 504. For example, the voice processing application may infer that the voice command represented by node 330 is not intended for mobile device 114 because mobile device 114 is off and thus cannot switch to a particular app.

In some embodiments, as shown in FIG. 5, the voice processing application may cause a connection between node 302 and node 330 in updated knowledge graph 500, even if such relationship did not previously exist in knowledge graph 300. In some embodiments, the voice processing application may prioritize, based on the device state information, which nodes/connections to maintain (e.g., remotely and/or locally) and which nodes to delete when certain entities/connections are not relevant. For example, node 304 representing mobile device 114 may be temporarily removed if mobile device 114 is off or is being used for another task such as a video conference and is not available to switch to another application. In some embodiments, certain nodes and/or edges (e.g., 502, 504, 506, 508, 510) may be temporal nodes or edges. For example, the voice processing application may delete such as soon as the command is processed or after a fixed time duration after processing is performed and/or the voice processing application may be configured to dynamically create multiple voice shortcuts and process them locally. In some embodiments, when the voice command represented by node 330 is received or predicted, the voice processing application may refer to a local database for keyword spotting and refer to the local knowledge graph for recognized words, intents and/or entities. The voice processing application may reconstruct the intent by correlating the words and entities of the predicted or received command (e.g., including separating recognized words, entities, and intents from other words, entities, and intents present in a query).

In some embodiments, the voice processing application, in storing the predicted or received voice input or commands in association with device state information and/or any other suitable data, may separate device characteristics from the predicted or received command. The voice processing system may decouple device-specific words from the predicted or received voice input or voice command by parsing such input to separate any reference to a device from other portions of the input. For example, if TV 106 is configured to process the voice command "Switch off the TV," the voice processing application system can separate "Switch off" from "the TV" using any suitable NLP techniques discussed herein or any other suitable techniques. Such aspects may allow the command "Switch off" to be used for another device that may not originally have support for such command, thereby enabling interoperability among the voice assistant devices and/or service of environment 100 to facilitate an integrated home environment.

In some embodiments, recognized commands may be stored in common database 222 and/or other suitable devices or databases, and may be stored in association with one or more connected devices capable of processing and/or performing an action based upon such commands. Such devices may, but need not, store these common commands locally. Such features may enable connected devices to process more commands, and mapping of intent to device-specific command format may help in constructing commands for specific devices.

For example, as shown at data structure 124, voice commands of "Increase volume, "Decrease volume," "Mute volume" and/or "Provide remote notification" may be mapped to TV 106 and 108, voice assistant devices 110 and 112, mobile device 114, speakers 123, a smart doorbell, a microphone, a security alarm, and/or any other suitable device. As another example, the voice command of "Skip present segment" or "Skip segment" may be mapped to TV 106, TV 108, mobile device 114, speakers 123, voice assistant devices 110 and 112, and/or any other suitable device. For example, instead of storing "Increase the volume of the TV" and "Increase the volume of the phone" as two different templates, the system may use a single instance of common part "Increase volume" and associate devices therewith.

In some embodiments, the voice processing application may be configured to maintain and store registered user accounts and/or profiles. For example, user 102 may be associated with a particular user account or profile with the voice processing application, accessible via any number of user devices at which the user provides his or her credentials, and/or from any number of different locations. The voice processing application may monitor and store any suitable type of user information associated with user 102, and may reference the particular user profile or account to determine an identity of a human (e.g., user 102) in environment 100. The user profile or account may include user information input by the user, e.g., characteristics of the user, such as, interests, or any other suitable user information, or any combination thereof, and/or user information gleaned from monitoring of the user or other activities of the user, e.g., current and/or historical biometric data of the user, facial or voice characteristics of the user, historical actions or behaviors of the user, user interactions with websites or applications (e.g., social media, or any other suitable website or application, or any combination thereof) or purchase history, or any other suitable user information, or any combination thereof. In some embodiments, certain devices may be associated with a particular user device or user account, e.g., device identifiers for one or more of user devices 106, 110, 114 may be stored in association with a user profile of user 102. In some embodiments, such profiles may be used to tailor predicted voice inputs and/or commands to specific user profiles.

Figure 6:
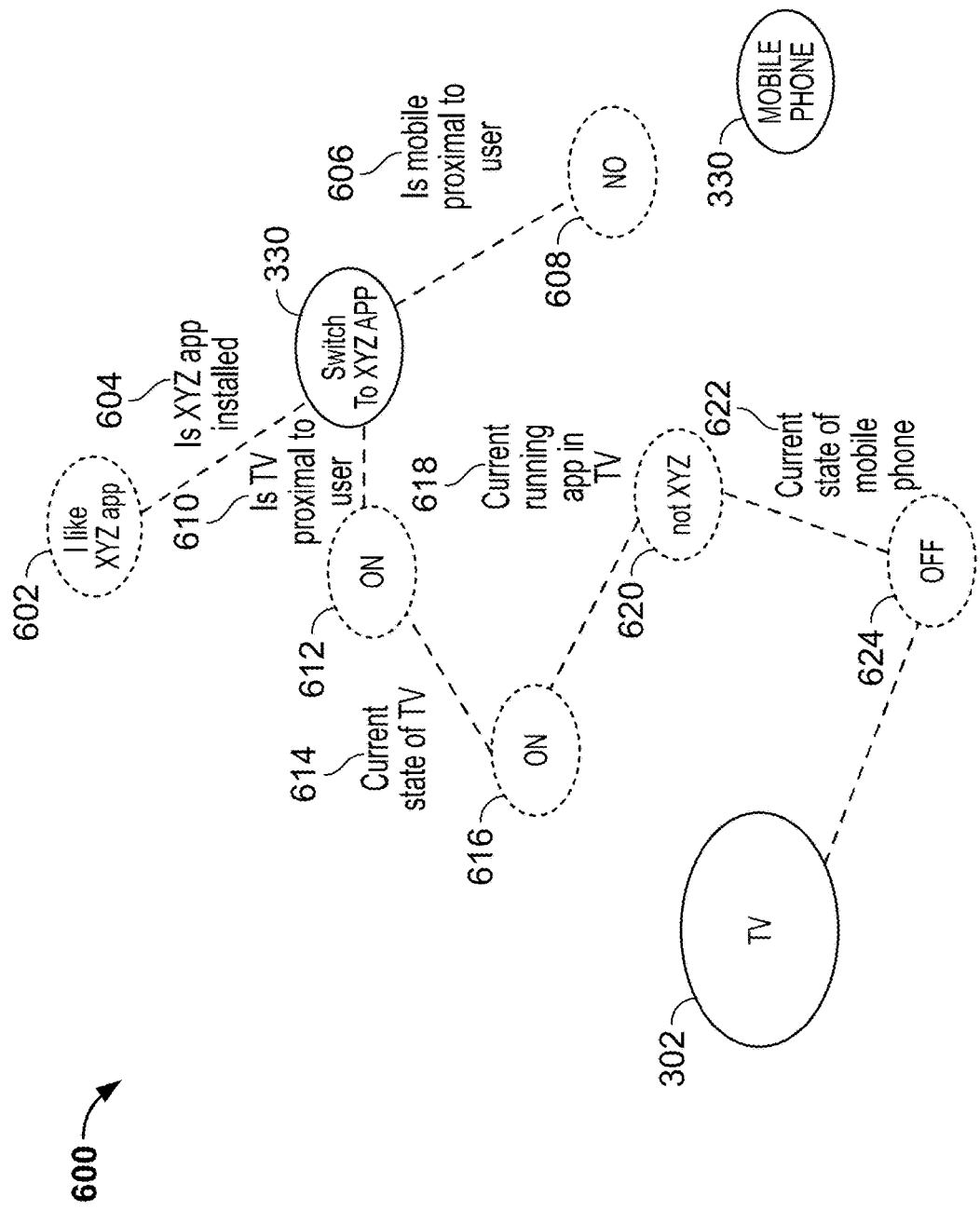
FIG. 6 shows an illustrative knowledge graph, in accordance with some embodiments of this disclosure.

FIG. 6 shows an illustrative knowledge graph 600, in accordance with some embodiments of this disclosure. As shown in FIG. 6, node 602 may represent a received or predicted voice command of "I like XYZ app," which can be mapped to node 330 representing the received or predicted voice command of "Switch to XYZ App." For example, the voice processing application may infer that the comment represented by node 602 indicates a desire to switch to the XYZ app. Based at least in part on the device state information, the voice processing application may determine that the XYZ app is installed on one or more devices (e.g., TV 106 represented by node 302 and mobile device 114 represented by node 330, in communication with voice assistant 110), as shown by way of edge 604. The voice processing application may further determine that one of such devices, mobile device 114 represented by node 330, is not proximal to user 102 associated with the uttered or predicted voice command represented by node 602 (as shown by edge 606 and node 608). Thus, mobile device 114 may be ruled out as a candidate device for which action should be taken based on the voice command, as shown by the absence of an edge connection between node 330 and knowledge graph 600. On the other hand, as shown by edge 610 and node 612 and edge 614 and node 616, the voice processing application may determine, based on the device state information and/or any suitable location or contextual information, that TV 106 is on, and that user 102 is proximal to TV 106. The voice processing application may further determine, as shown by edge 618 and node 620, that TV 106 is not currently running or executing the XYZ app, weighing towards an inference that "I like XYZ app" represented by node 602 likely constitutes a command for the particular device to be switched to the XYZ app. The voice processing application may further determine, as shown by edge 622 and node 624, that mobile device 114 is off. Accordingly, based on any suitable portion of the above-described logical steps, the voice processing application may cause smart TV 106 to perform an action, e.g., switch a currently executing app to the XYZ app, related to predicted or received voice input represented by node 602.

Figure 7:
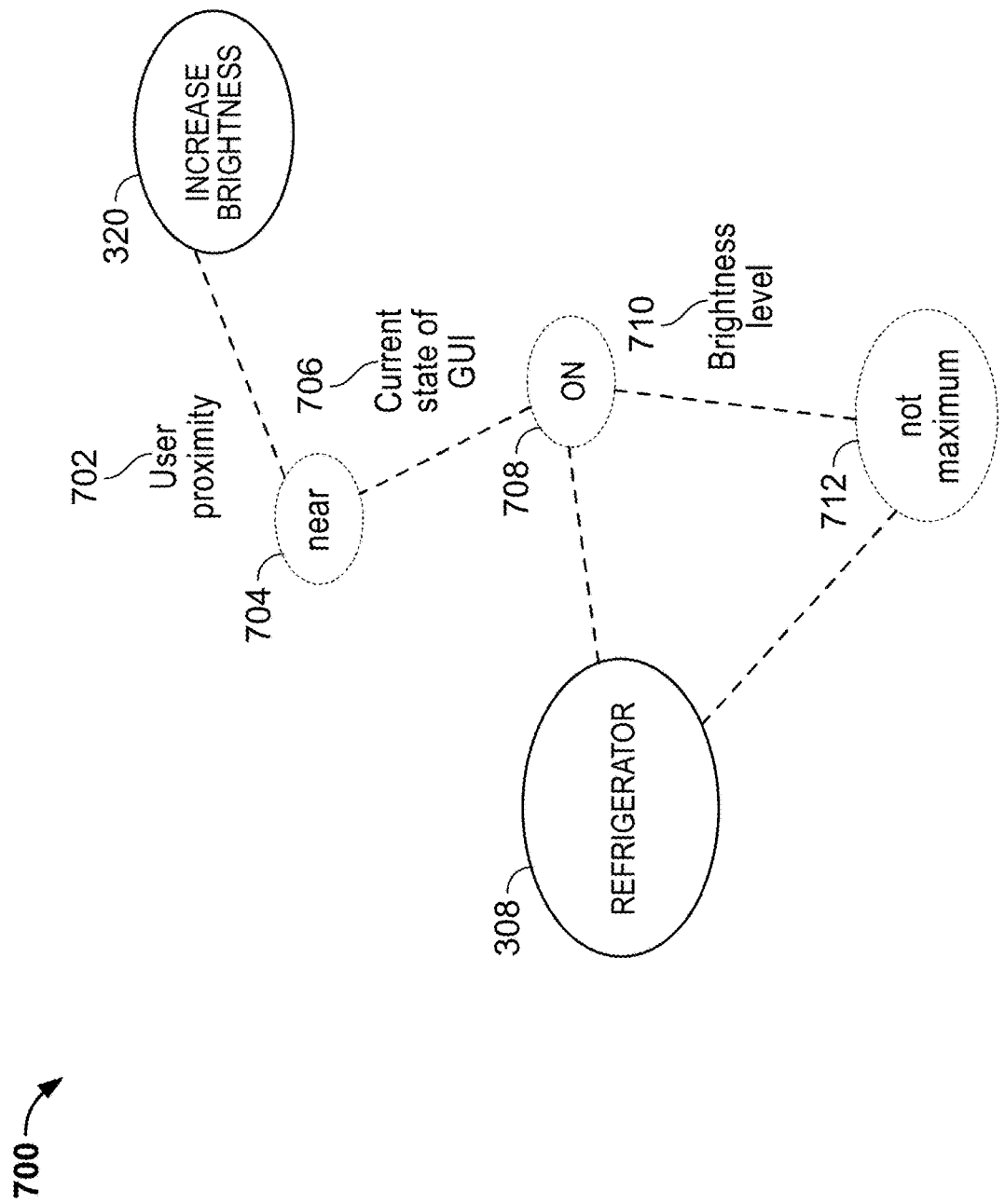
FIG. 7 shows an illustrative knowledge graph, in accordance with some embodiments of this disclosure.

FIG. 7 shows an illustrative knowledge graph 700, in accordance with some embodiments of this disclosure. As shown in FIG. 7, node 320 represents a predicted or received voice command (e.g., a voice shortcut) of "Increase brightness." As shown in FIG. 3, such node 320, at least initially, may not share a connection with node 308 representing refrigerator 118. However, as shown in FIG. 7, the voice processing application may, based at least in part on device state information and contextual information, determine that a particular user, e.g., user 104 currently providing voice input or predicted to provide voice input, is proximate to refrigerator 118, as shown by way of edge 702 and node 704. Further, the voice processing application may determine that such refrigerator 118 is a smart appliance that comprises a graphical user interface (GUI) that is currently on, as shown by edge 706 and/or node 708.

In some embodiments, certain devices that user 104 may be proximate to, e.g., voice assistant 112, may be determined not to have a display, and thus the voice input represented by node 320 may be determined as inapplicable to such a device, which may be removed from the knowledge graph at least temporarily. The voice processing application may further determine, based on the device state information, that the brightness of such GUI of refrigerator 118 is not at a maximum level or maximum value (as shown by edge 710 and node 712), and thus the voice input represented by node 320 is relevant. Accordingly, the voice processing application may identify refrigerator 118 as a target device, by creating the temporal nodes and connections shown in FIG. 7, and the voice processing application may cause refrigerator 118 to execute a command to increase the brightness of its GUI.

Figure 8:
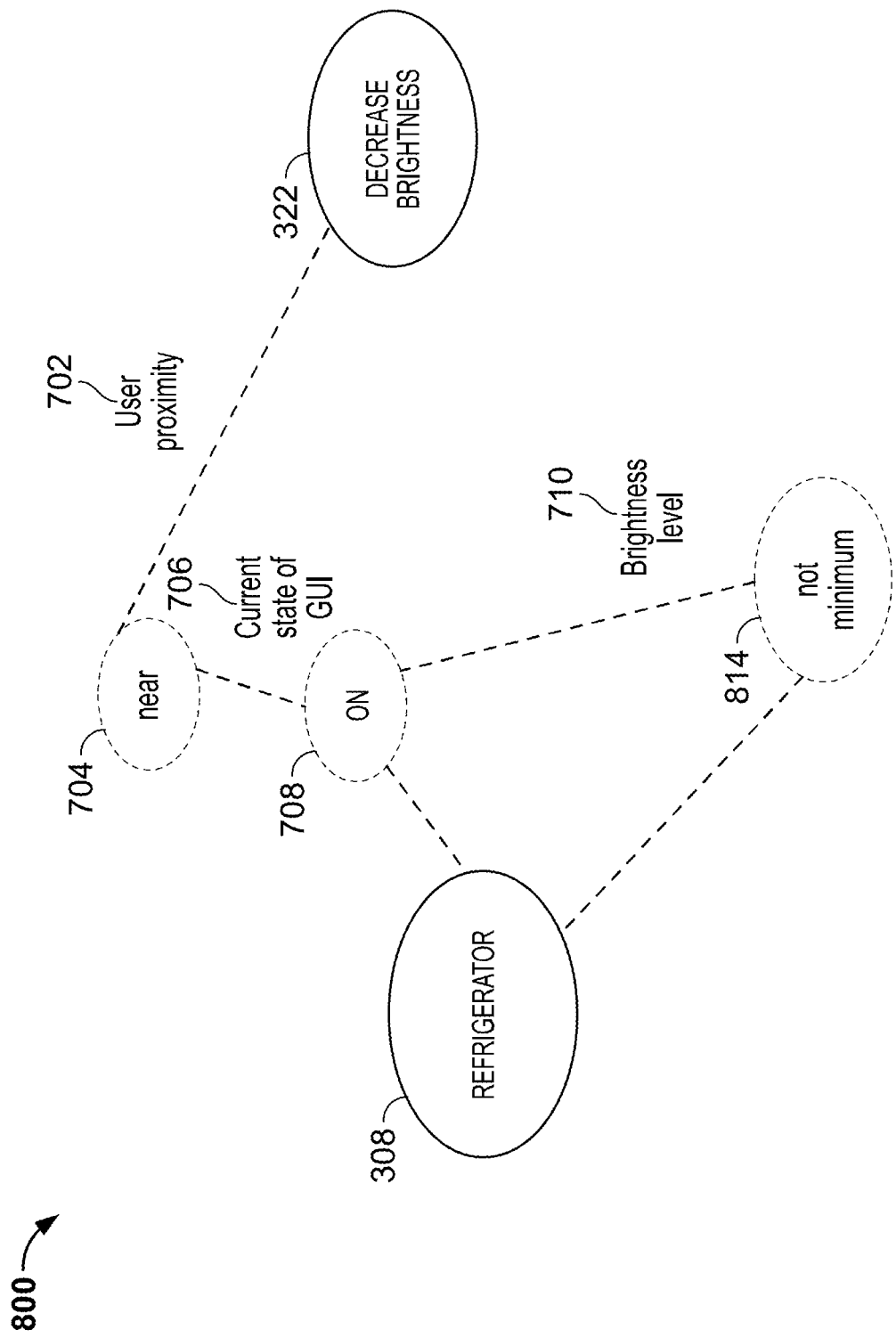
FIG. 8 shows an illustrative knowledge graph, in accordance with some embodiments of this disclosure.

FIG. 8 shows an illustrative knowledge graph 800, in accordance with some embodiments of this disclosure. The example of FIG. 8 is similar to the example of FIG. 7, except the predicted or received voice command may be "Decrease brightness" represented by node 322 of FIG. 8, rather than the voice command "Increase brightness" represented by node 320 of FIG. 7. Accordingly, the voice processing application may perform similar processing as described in FIG. 7, except the voice processing application may check, as shown at node 814, whether the brightness of refrigerator 118 represented by node 308 is at a minimum value or level. Upon determining that such brightness is not at a minimum level or minimum value, as shown by edge 710 and node 814, the voice processing application may identify refrigerator 118 as a target device, by creating the temporal nodes and connections, and may cause refrigerator 118 to execute a command to decrease the brightness of its GUI.

Figure 9:
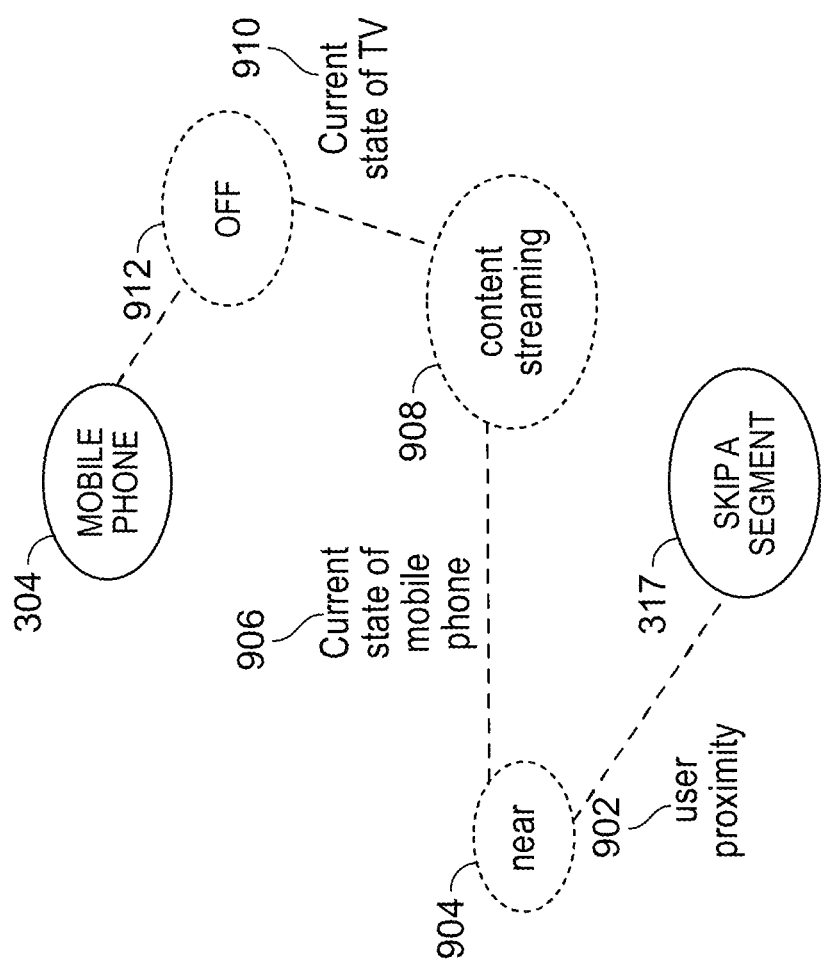
FIG. 9 shows an illustrative knowledge graph, in accordance with some embodiments of this disclosure.

FIG. 9 shows an illustrative knowledge graph 900, in accordance with some embodiments of this disclosure. Node 317 of knowledge graph 900 represents a voice command, e.g., received from user 102 and/or predicted as a potential voice command, of "Skip a segment." As shown by edge 902 and node 904 of knowledge graph 900, the voice processing application may determine, based at least in part on device state information and a location of mobile device 114 and user 102, that user 102 providing or predicted to provide voice input is proximal to mobile device 114. The voice processing application may further determine, as shown by edge 906 and node 908, that a current state of mobile device 114 indicates that such device is currently streaming content, e.g., a media asset received from a content provider (e.g., associated with media content source 1202 of FIG. 12). Such information weighs in favor of a prediction that the received or predicted voice input corresponding to node 317 is intended for mobile device 114, and taken together with edge 910 and node 912 indicating that TV 106 is off (and thus cannot skip segments), may lead to a determination that "Skip a segment" is intended for mobile device 114. Accordingly, the voice processing application may cause mobile device 114 to skip a current segment of a media asset being played at or via mobile device 114.

Figure 10:
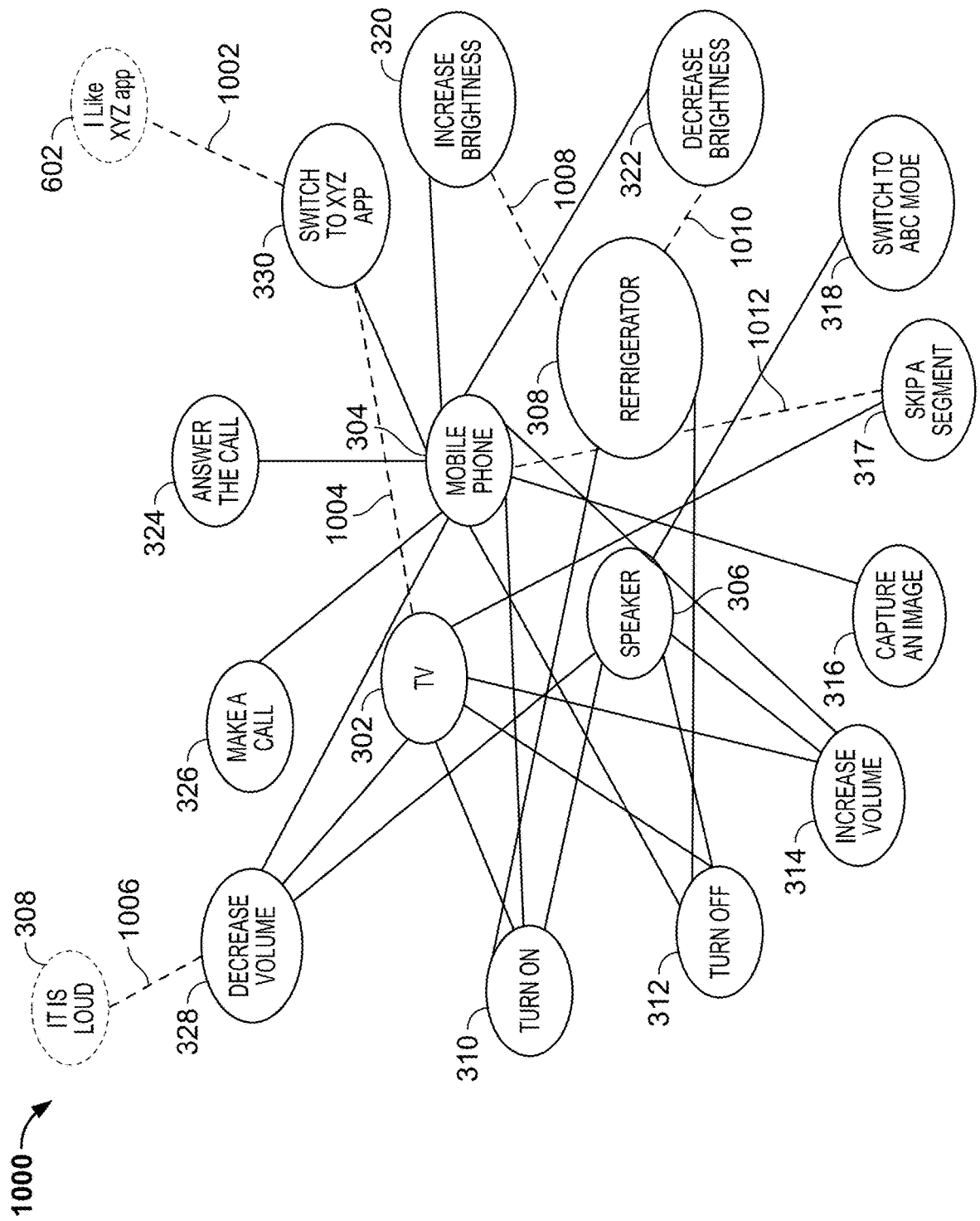
FIG. 10 shows an illustrative knowledge graph, in accordance with some embodiments of this disclosure.

FIG. 10 shows an illustrative knowledge graph 1000, in accordance with some embodiments of this disclosure. As shown in FIG. 10, knowledge graph 300 of FIG. 3 may be updated to correspond to knowledge graph 1000. The voice processing application may cause knowledge graph 1000 to include new node 308 representing the predicted or received voice input of "It is loud" based on the processing of FIG. 4, and to include new node 602 representing the predicted or received voice input of "I like XYZ app" based on the processing of FIG. 6. The voice processing application may further cause knowledge graph 1000 to include new edge connection 1002 establishing a relationship between node 602 and node 330 (based on the processing of FIG. 6). The voice processing application may further cause knowledge graph 1000 to include new edge connection 1004 establishing a relationship between node 302 and node 330 (based on the processing of FIG. 5). The voice processing application may further cause knowledge graph 1000 to include new edge connection 1006 establishing a relationship between node 308 and node 328 (based on the processing of FIG. 4). The voice processing application may further cause knowledge graph 1000 to include new edge connection 1008 establishing a relationship between node 308 and node 320 (based on the processing of FIG. 7). The voice processing application may further cause knowledge graph 1000 to include new edge connection 1010 establishing a relationship between node 308 and node 322 (based on the processing of FIG. 8). The voice processing application may further cause knowledge graph 1000 to include new edge connection 1012 establishing a relationship between node 304 and node 317 (based on the processing of FIG. 9). As shown, in at least some embodiments, the intermediate nodes shown in FIGS. 4-9 may be omitted from the updated knowledge graph 700. Alternatively, the voice processing application may add the intermediate nodes and edges, associated with the inferences made based on the device state information, predicted states of the device, predicted commands and inferred connections, to the one or more knowledge graphs stored locally and/or remotely. As another example, an updated knowledge graph 1000 stored at cloud server 126 may include all the predefined nodes, predefined connections, temporal nodes, and temporal connections along with its inferences. In some embodiments, knowledge graph 1000 stored locally in environment 100 may include a subset thereof, and may be updated with new nodes and connections based on the predicted voice commands and/or instruction and/or comments.

In some embodiments, environment 100 may have a limited number of users, most of whose voices may have similar phonetics, and thus the voice processing application may store audio signals to word mappings, and audio to entity mappings, for specific users, e.g., in connection with user profiles for users of environment 100, locally and/or remotely. This may enable certain commands to be processed locally that would otherwise be transmitted to server 126 for processing, and/or may improve tailoring of voice command predictions for specific users. In some embodiments, dynamic wake word configuration module 216 may be configured to automatically add and/or edit and/or delete a wake word or wake term based on predicted voice commands and/or predicted voice instructions. In some embodiments, the voice processing application may ensure that a list of certain wake words (e.g., "Hey Siri"; "Hey Google"; "Alexa," etc.) are not deleted, unless a software update or other indication from a manufacturer indicates such wake words or wake terms have changed.

In some embodiments, voice input routing module 218 may be configured to receive, at a microphone associated with a first device, voice input having a wake word or term associated with a second device, and route the voice input to be processed by the second device or another device having a similar capability as the second device. Such routing may leverage the common list of wake words, e.g., compiled and maintained by modules 208 and 216. For example, the voice processing application may support cross usage of wake words using networked microphone capability of various devices in environment 100 capable of processing voice input and/or voice commands. As an example, the voice processing application may receive a voice command (e.g., "Hey Siri, switch on the living room light") by way of a first device (e.g., voice assistant 110), which can be activated by any of the wake words or wake terms compiled by the voice processing application. User 102 may not be near a second device, such as, for example, mobile device 114 (e.g., an iPhone, associated with the wake word "Hey Siri"), and voice assistant 110 may be an Amazon device typically responsive to the wake word "Alexa." Nonetheless, voice assistant 110 may recognize the "Hey Siri" wake word based on the compiled list of wake words, capture subsequent voice input, and route such data to mobile device 114 for processing, via the home network or gateway of environment 100. Such second device (e.g., an iPhone) may perform the action associated with the received voice input, e.g., transmit an instruction to turn on the living room light. In some embodiments, the voice processing application may cause the first device (e.g., voice assistant 110) to process the voice command, or a third device having a similar capability to process the voice command and/or transmit the data to a remote server for further processing, in the absence of the second device (e.g., the iPhone cannot be found). For example, it may not matter to the user which device processes the request to turn the living room light on, just that the action is performed.

In some embodiments, such feature enabling processing of the request by a particular voice assistant device, even when another voice assistant device was intended by a user, can be enabled or disabled by the user. Such features may create an open framework, where all the smart assistance devices and/or services may reference the compiled list of recognized wake-words to detect voice commands. Such open architecture may enable creating an ad-hoc wireless network of trusted devices where any device can work as a gateway, and in which the voice processing capabilities of connected devices can be exploited. In some embodiments, such features may allow the first device (e.g., an Amazon voice assistant) to capture audio and internally route the raw audio signal to Siri, e.g., if the voice query/command referencing Siri can be recognized locally. In some embodiments, the voice processing application may enable reduction of the number of microphones embedded in some voice assistance devices, e.g., by utilizing microphones of other user-connected devices (e.g., smart TV 106) which might be located closer to user 102.

Figure 11:
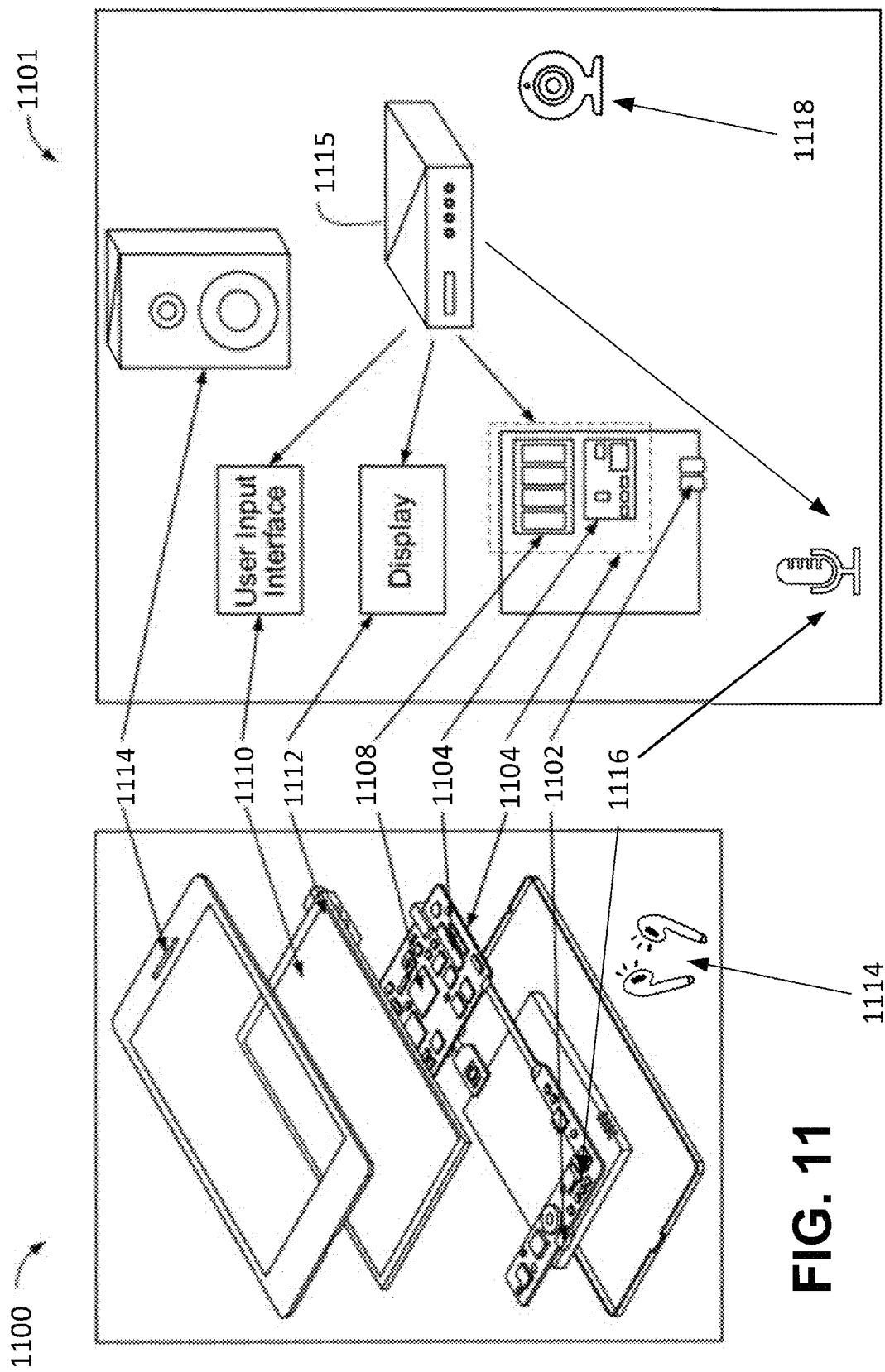
FIG. 11 shows illustrative devices, in accordance with some embodiments of this disclosure.
Figure 12:
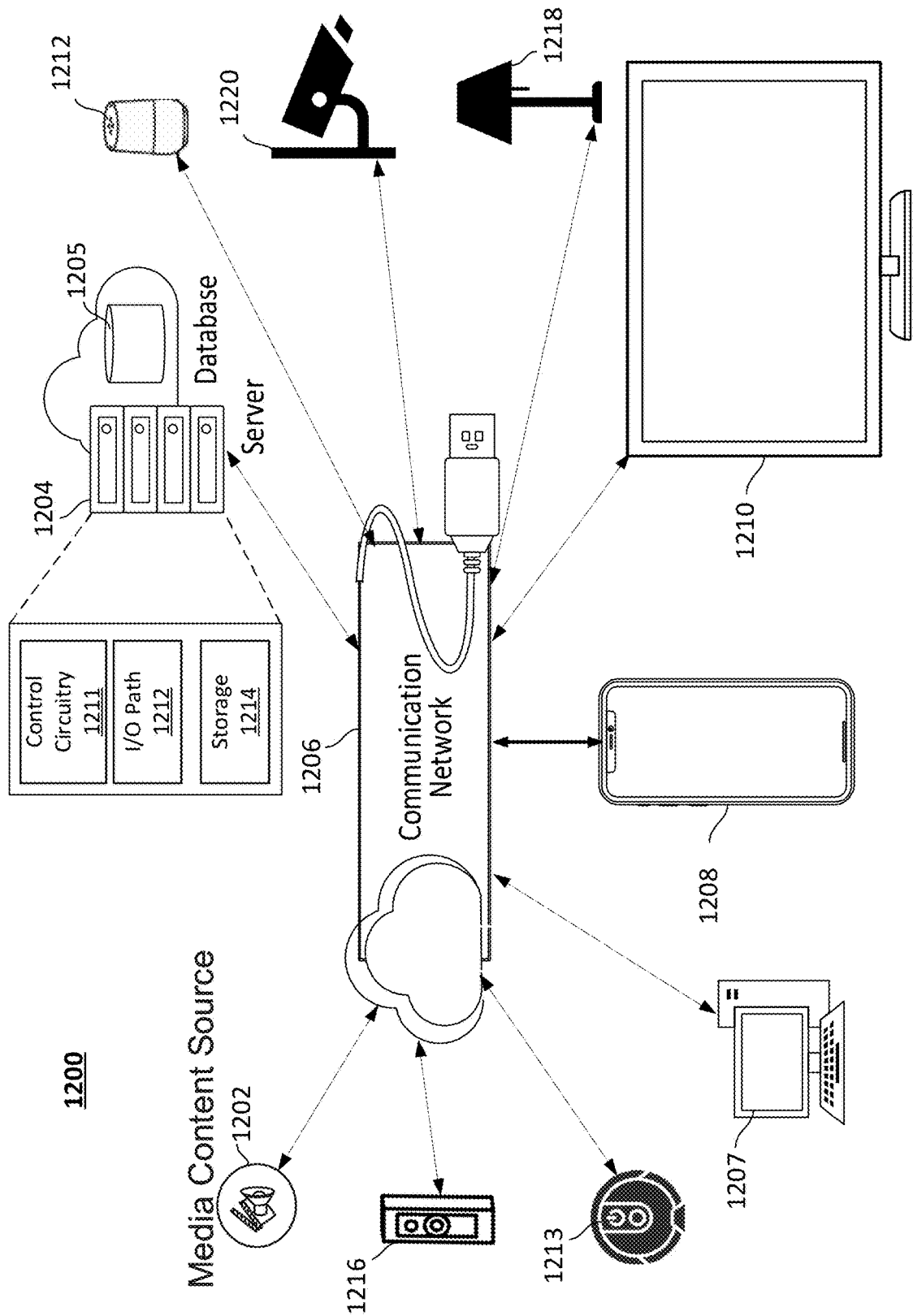
FIG. 12 shows illustrative systems, in accordance with some embodiments of this disclosure.

FIGS. 11-12 describe illustrative devices, systems, servers, and related hardware for determining a predicted voice command, and a particular device for which the predicted voice command is intended, in accordance with some embodiments of this disclosure. FIG. 11 shows generalized embodiments of illustrative devices 1100 and 1101, which may correspond to, e.g., devices 106, 108, 110, 112, 114, 116, 118, 120 and/or 123 of FIG. 1 and/or other suitable devices. For example, device 1100 may be a smartphone device, a tablet or any other suitable device capable of processing and/or performing an action based on voice input or otherwise interfacing with the voice processing application described herein. In another example, device 1101 may be a user television equipment system or device. User television equipment device 1101 may include set-top box 1115. Set-top box 1115 may be communicatively connected to microphone 1116, audio output equipment (e.g., speaker or headphones 1114), and display 1112. In some embodiments, microphone 1116 may receive audio corresponding to a voice of a user, e.g., a voice input or a voice command. In some embodiments, display 1112 may be a television display or a computer display. In some embodiments, set-top box 1115 may be communicatively connected to user input interface 1110. In some embodiments, user input interface 1110 may be a remote control device. Set-top box 1115 may include one or more circuit boards. In some embodiments, the circuit boards may include control circuitry, processing circuitry, and storage (e.g., RAM, ROM, hard disk, removable disk, etc.). In some embodiments, the circuit boards may include an input/output path. More specific implementations of devices are discussed below in connection with FIG. 12. In some embodiments, device 1100 may comprise any suitable number of sensors (e.g., gyroscope or gyrometer, or accelerometer, etc.), as well as a GPS module (e.g., in communication with one or more servers and/or cell towers and/or satellites) or any other suitable localization technique, to ascertain a location of device 1100. In some embodiments, device 1100 comprises a rechargeable battery that is configured to provide power to the components of the device.

Each one of device 1100 and device 1101 may receive content and data via input/output (I/O) path 1102. I/O path 1102 may provide content (e.g., broadcast programming, on-demand programming, Internet content, content available over a local area network (LAN) or wide area network (WAN), and/or other content) and data to control circuitry 1104, which may comprise processing circuitry 1106 and storage 1108. Control circuitry 1104 may be used to send and receive commands, requests, and other suitable data using I/O path 102, which may comprise I/O circuitry. I/O path 1102 may connect control circuitry 1104 (and specifically processing circuitry 1106) to one or more communications paths (described below). I/O functions may be provided by one or more of these communications paths, but are shown as a single path in FIG. 11 to avoid overcomplicating the drawing. While set-top box 1115 is shown in FIG. 11 for illustration, any suitable computing device having processing circuitry, control circuitry, and storage may be used in accordance with the present disclosure. For example, set-top box 1115 may be replaced by, or complemented by, a personal computer (e.g., a notebook, a laptop, a desktop), a smartphone (e.g., device 1100), a tablet, a network-based server hosting a user-accessible client device, a non-user-owned device, any other suitable device, or any combination thereof.

Control circuitry 1104 may be based on any suitable control circuitry such as processing circuitry 1106. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1104 executes instructions for the voice processing application stored in memory (e.g., storage 1108). Specifically, control circuitry 1104 may be instructed by the voice processing application to perform the functions discussed above and below. In some implementations, processing or actions performed by control circuitry 1104 may be based on instructions received from the voice processing application.

In client/server-based embodiments, control circuitry 1104 may include communications circuitry suitable for communicating with a server or other networks or servers. The voice processing application may be a stand-alone application implemented on a device or a server. The voice processing application may be implemented as software or a set of executable instructions. The instructions for performing any of the embodiments discussed herein of the voice processing application may be encoded on non-transitory computer-readable media (e.g., a hard drive, random-access memory on a DRAM integrated circuit, read-only memory on a BLU-RAY disk, etc.) For example, in FIG. 11, the instructions may be stored in storage 1108, and executed by control circuitry 1104 of a device 1100.

In some embodiments, the voice processing application may be a client/server application where only the client application resides on device 1100, and a server application resides on an external server (e.g., server 1204). For example, the voice processing application may be implemented partially as a client application on control circuitry 1104 of device 1100 and partially on server 1204 (which may correspond to server 126 of FIG. 1) as a server application running on control circuitry 1211. Server 1204 may be a part of a local area network with one or more of devices 1100 or may be part of a cloud computing environment accessed via the internet. In a cloud computing environment, various types of computing services for performing searches on the internet or informational databases, providing storage (e.g., for a database) or parsing data are provided by a collection of network-accessible computing and storage resources (e.g., server 1204), referred to as "the cloud." Device 1100 may be a cloud client that relies on the cloud computing capabilities from server 1204 to determine whether processing should be offloaded and facilitate such offloading. When executed by control circuitry 1104 or 1211, the voice processing application may instruct control circuitry 1104 or 1211 circuitry to perform processing tasks for determining a predicted voice command, and a particular device for which the predicted voice command is intended. The client application may instruct control circuitry 1104 to perform processing tasks for determining a predicted voice command, and a particular device for which the predicted voice command is intended.

Control circuitry 1104 may include communications circuitry suitable for communicating with a server, social network service, a table or database server, or other networks or servers The instructions for carrying out the above mentioned functionality may be stored on a server (which is described in more detail in connection with FIG. 11). Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communication networks or paths (which is described in more detail in connection with FIG. 12). In addition, communications circuitry may include circuitry that enables peer-to-peer communication of devices, or communication of devices in locations remote from each other (described in more detail below).

Memory may be an electronic storage device provided as storage 1108 that is part of control circuitry 1104. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 1108 may be used to store various types of content described herein as well as voice processing application data described above. Nonvolatile memory may also be used (e.g., to launch a boot-up routine and other instructions). Cloud-based storage may be used to supplement storage 1108 or instead of storage 1108.

Control circuitry 1104 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 1104 may also include scaler circuitry for upconverting and downconverting content into the preferred output format of user equipment 1100. Control circuitry 1104 may also include digital-to-analog converter circuitry and analog-to-digital converter circuitry for converting between digital and analog signals. The tuning and encoding circuitry may be used by device 1100, 1101 to receive and to display, to play, or to record content. The tuning and encoding circuitry may also be used to receive media consumption data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 1108 is provided as a separate device from device 1100, the tuning and encoding circuitry (including multiple tuners) may be associated with storage 1108.

Control circuitry 1104 may receive instruction from a user by way of user input interface 1110. User input interface 1110 may be any suitable user interface, such as a remote control, mouse, trackball, keypad, keyboard, touch screen, touchpad, stylus input, joystick, voice recognition interface, or other user input interfaces. Display 1112 may be provided as a stand-alone device or integrated with other elements of each one of device 1100 and device 1101. For example, display 1112 may be a touchscreen or touch-sensitive display. In such circumstances, user input interface 1110 may be integrated with or combined with display 1112. In some embodiments, user input interface 1110 includes a remote-control device having one or more microphones, buttons, keypads, any other components configured to receive user input or combinations thereof. For example, user input interface 1110 may include a handheld remote-control device having an alphanumeric keypad and option buttons. In a further example, user input interface 1110 may include a handheld remote-control device having a microphone and control circuitry configured to receive and identify voice commands and transmit information to set-top box 1115.

Audio output equipment 1114 may be integrated with or combined with display 1112. Display 1112 may be one or more of a monitor, a television, a liquid crystal display (LCD) for a mobile device, amorphous silicon display, low-temperature polysilicon display, electronic ink display, electrophoretic display, active matrix display, electro-wetting display, electro-fluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. A video card or graphics card may generate the output to the display 1112. Audio output equipment 1114 may be provided as integrated with other elements of each one of device 1100 and equipment 1101 or may be stand-alone units. An audio component of videos and other content displayed on display 1112 may be played through speakers (or headphones) of audio output equipment 1114. In some embodiments, audio may be distributed to a receiver (not shown), which processes and outputs the audio via speakers of audio output equipment 1114. In some embodiments, for example, control circuitry 1104 is configured to provide audio cues to a user, or other audio feedback to a user, using speakers of audio output equipment 1114. There may be a separate microphone 1116 or audio output equipment 1114 may include a microphone configured to receive audio input such as voice commands or speech. For example, a user may speak letters, terms, phrases, alphanumeric characters, words, etc. that are received by the microphone and converted to text by control circuitry 1104. In a further example, a user may voice commands that are received by a microphone and recognized by control circuitry 1104. Camera 1118 may be any suitable camera integrated with the equipment or externally connected and capable of capturing still and moving images. In some embodiments, camera 1118 may be a digital camera comprising a charge-coupled device (CCD) and/or a complementary metal-oxide semiconductor (CMOS) image sensor. In some embodiments, camera 1118 may be an analog camera that converts to digital images via a video card.

The voice processing application may be implemented using any suitable architecture. For example, it may be a stand-alone application wholly-implemented on each one of device 1100 and device 1101. In such an approach, instructions of the application may be stored locally (e.g., in storage 1108), and data for use by the application is downloaded on a periodic basis (e.g., from an out-of-band feed, from an Internet resource, or using another suitable approach). Control circuitry 1104 may retrieve instructions of the application from storage 1108 and process the instructions to provide the functionality of the voice processing application discussed herein. Based on the processed instructions, control circuitry 1104 may determine what action to perform when input is received from user input interface 1110. For example, movement of a cursor on a display up/down may be indicated by the processed instructions when user input interface 1110 indicates that an up/down button was selected. An application and/or any instructions for performing any of the embodiments discussed herein may be encoded on computer-readable media. Computer-readable media includes any media capable of storing data. The computer-readable media may be non-transitory including, but not limited to, volatile and non-volatile computer memory or storage devices such as a hard disk, floppy disk, USB drive, DVD, CD, media card, register memory, processor cache, Random Access Memory (RAM), etc.

Control circuitry 1104 may allow a user to provide user profile information or may automatically compile user profile information. For example, control circuitry 1104 may access and monitor network data, video data, audio data, processing data, participation data from a voice processing application and social network profile. Control circuitry 1104 may obtain all or part of other user profiles that are related to a particular user (e.g., via social media networks), and/or obtain information about the user from other sources that control circuitry 1104 may access. As a result, a user can be provided with a unified experience across the user's different devices.

In some embodiments, the voice processing application is a client/server-based application. Data for use by a thick or thin client implemented on each one of device 1100 and device 1101 may be retrieved on-demand by issuing requests to a server remote to each one of device 1100 and device 1101. For example, the remote server may store the instructions for the application in a storage device. The remote server may process the stored instructions using circuitry (e.g., control circuitry 1104) and generate the displays discussed above and below. The client device may receive the displays generated by the remote server and may display the content of the displays locally on device 1100. This way, the processing of the instructions is performed remotely by the server while the resulting displays (e.g., that may include text, a keyboard, or other visuals) are provided locally on device 1100. Device 1100 may receive inputs from the user via input interface 1110 and transmit those inputs to the remote server for processing and generating the corresponding displays. For example, device 1100 may transmit a communication to the remote server indicating that an up/down button was selected via input interface 1110. The remote server may process instructions in accordance with that input and generate a display of the application corresponding to the input (e.g., a display that moves a cursor up/down). The generated display may then be transmitted to device 1100 for presentation to the user.

In some embodiments, the voice processing application may be downloaded and interpreted or otherwise run by an interpreter or virtual machine (run by control circuitry 1104). In some embodiments, the voice processing application may be encoded in the ETV Binary Interchange Format (EBIF), received by control circuitry 1104 as part of a suitable feed, and interpreted by a user agent running on control circuitry 1104. For example, the voice processing application may be an EBIF application. In some embodiments, the voice processing application may be defined by a series of JAVA-based files that are received and run by a local virtual machine or other suitable middleware executed by control circuitry 1104. In some of such embodiments (e.g., those employing MPEG-2 or other digital media encoding schemes), the voice processing application may be, for example, encoded and transmitted in an MPEG-2 object carousel with the MPEG audio and video packets of a program.

FIG. 12 is a diagram of an illustrative system 1200, in accordance with some embodiments of this disclosure. Devices 1207, 1208, 1210, 1212, 1214, 1216, 1218 and 1220, or any other suitable devices, or any combination thereof, may be coupled to communication network 1206. Such devices may be present in a particular environment, such as, for example, environment 100 of FIG. 1. In some embodiments, at least a portion of such devices may correspond to device 1100 or 1101 of FIG. 11, or may include any suitable portion of the same or similar components as described in connection with FIG. 11. Communication network 1206 may be one or more networks including the Internet, a mobile phone network, mobile voice or data network (e.g., a 5G, 4G, or LTE network, or any other suitable network or any combination thereof), cable network, public switched telephone network, or other types of communication network or combinations of communication networks. Paths (e.g., depicted as arrows connecting the respective devices to the communication network 1206) may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. Communications with the client devices may be provided by one or more of these communications paths but are shown as a single path in FIG. 12 to avoid overcomplicating the drawing.

Although communications paths are not drawn between devices, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The devices may also communicate with each other directly through an indirect path via communication network 1206.

System 1200 may comprise media content source 1202 and one or more servers 1204. Communications with media content source 1202 and server 1204 may be exchanged over one or more communications paths but are shown as a single path in FIG. 12 to avoid overcomplicating the drawing. In addition, there may be more than one of each of media content source 1202 and server 1204, but only one of each is shown in FIG. 12 to avoid overcomplicating the drawing. If desired, media content source 1202 and server 1204 may be integrated as one source device. In some embodiments, the voice processing application may be executed at one or more of control circuitry 1211 of server 1204 (and/or control circuitry of devices 1207, 1208, 1210, 1212, 1214, 1216, 1218 and/or 1220, or any other suitable devices, or any combination thereof). In some embodiments, data structure 124 of FIG. 1, or any other suitable data structure or any combination thereof, may be stored at database 1205 maintained at or otherwise associated with server 1204, and/or at storage of one or more of devices 1207, 1208, 1210, 1212, 1214, 1216, 1218 and/or 1220, at least one of which may be configured to host or be in communication with database 222 of FIG. 2. In some embodiments, systems 202 and 204, and the modules thereof, may be implemented by the voice processing application across any suitable combination of the devices or servers or databases of FIG. 12. The knowledge graphs described in connection with FIGS. 2-10 may be stored at, e.g., any of devices 1207, 1208, 1210, 1212, 1214, 1216, 1218 and/or 1220, and/or server 1204, and/or database 1205 and/or database 222 or any other suitable device described herein.

In some embodiments, server 1204 may include control circuitry 1211 and storage 1214 (e.g., RAM, ROM, Hard Disk, Removable Disk, etc.). Storage 1214 may store one or more databases. Server 1204 may also include an input/output path 1212. I/O path 1212 may provide media consumption data, social networking data, device information, or other data, over a local area network (LAN) or wide area network (WAN), and/or other content and data to control circuitry 1211, which may include processing circuitry, and storage 1214. Control circuitry 1211 may be used to send and receive commands, requests, and other suitable data using I/O path 1212, which may comprise I/O circuitry. I/O path 1212 may connect control circuitry 1211 (and specifically control circuitry) to one or more communications paths. I/O path 1212 may comprise I/O circuitry.

Control circuitry 1211 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1211 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 1211 executes instructions for a voice processing application stored in memory (e.g., the storage 1214). Memory may be an electronic storage device provided as storage 1014 that is part of control circuitry 1011.

Device 1210 may be a smart television, e.g., corresponding to smart TV 106, 108, device 1207 may be user computer equipment, and device 1208 may be a wireless user communication device, each of which may be configured to include some or all of the features of the voice processing application described herein. The voice processing application may be tailored to the capabilities of the particular device. For example, on user computer equipment 1207, the voice processing application may be provided in a visual layout where the voice processing application may recite audio prompts of the voice processing application. In another example, the voice processing application may be scaled down for wireless user communications device 1208. In another example, the assistant application may not provide a graphical user interface (GUI) and may listen to and dictate audio to a user such as for voice assistant device 1212, which in some instances, may not comprise a display. Various network-connected devices or IoT devices may be connected via a home network and may be capable of being controlled using the voice processing application and/or IoT applications and/or using voice assistant device 1212.

Figure 13:
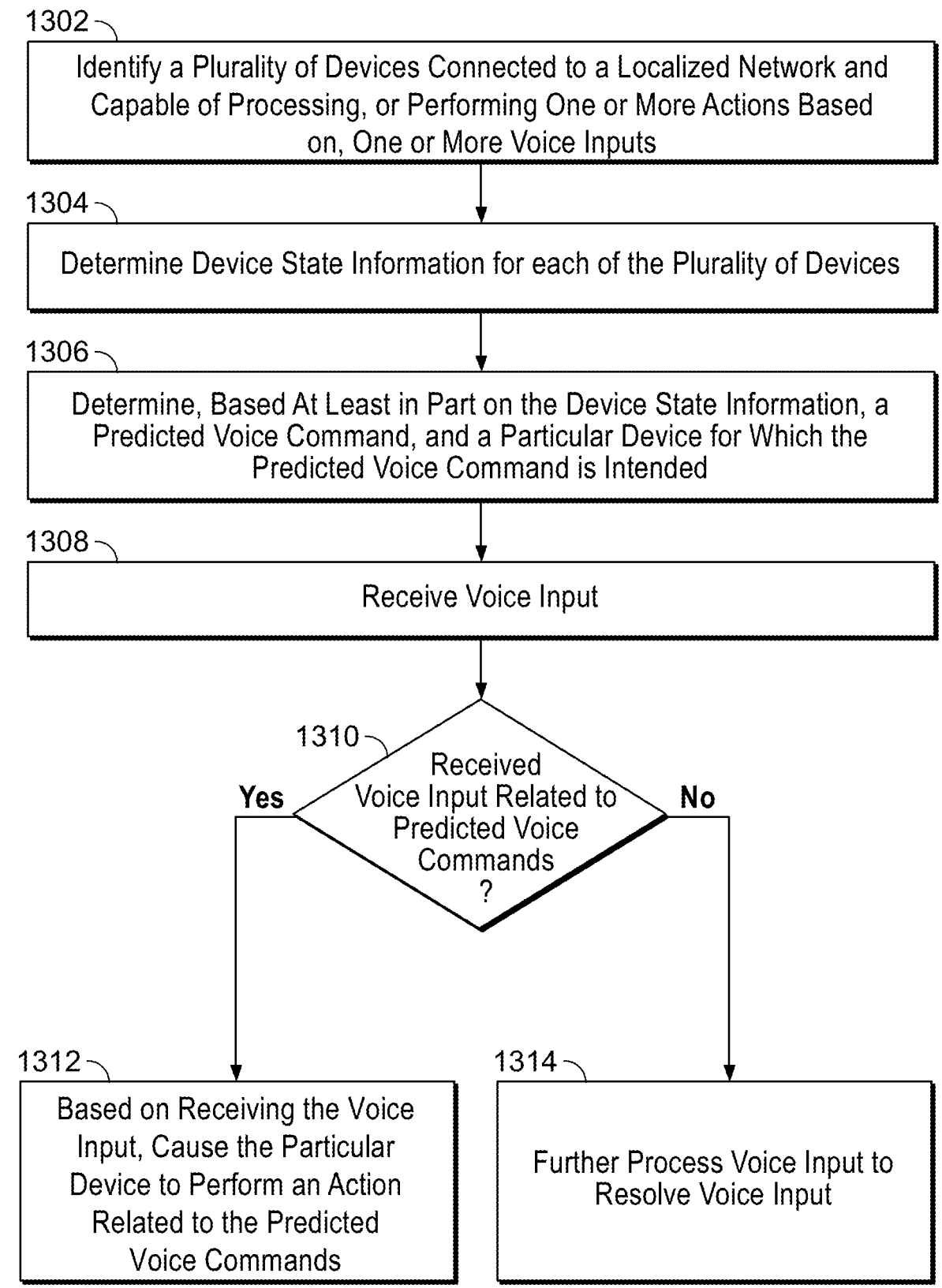
FIG. 13 is a flowchart of a detailed illustrative process for determining a predicted voice command, and a particular device for which the predicted voice command is intended, in accordance with some embodiments of this disclosure.

Voice assistant device 1212 (which may correspond to voice assistant devices 110 and 112 of FIG. 1) may include a smart speaker, a stand-alone voice assistant, smarthome hub, etc. Voice assistant device 1212 may be configured to interface with various devices, such as, for example, devices 1207, 1208 and/or 1210, and/or autonomous cleaning device 1213, smart doorbell 1216, smart lamp 1218 (which may correspond to smart lamp 120 of FIG. 1), security camera 1220, smart refrigerator 118, networking equipment 116, and/or any other suitable device. In some embodiments, voice assistant device 1212 may be configured to process a voice command and transmit such processed voice command or voice input to any of such devices with an instruction for such device to perform an action or otherwise forward voice input to a particular device, determined to be intended by the user, for processing. In some embodiments, devices, e.g., devices 1207, 1208, 1210 and/or any other suitable device, may be configured to FIG. 13 is a flowchart of a detailed illustrative process for determining a predicted voice command, and a particular device for which the predicted voice command is intended, in accordance with some embodiments of this disclosure. In various embodiments, the individual steps of process 1300 may be implemented by one or more components of the devices and systems of FIGS. 1-12. Although the present disclosure may describe certain steps of process 1300 (and of other processes described herein) as being implemented by certain components of the devices and systems of FIGS. 1-12, this is for purposes of illustration only, and it should be understood that other components of the devices and systems of FIGS. 1-12 may implement those steps instead.

At 1302, control circuitry (e.g., control circuitry 1104, and/or control circuitry of any suitable device in environment 100 and/or control circuitry 1211 of server 1204) may identify a plurality of devices connected to a localized network and capable of processing, or performing one or more actions based on, one or more voice inputs. For example, the control circuitry may identify smart television 106, 108; digital assistant 110, 112; mobile device 114, smart refrigerator 118, smart lamp 120 and/or speakers 123 and/or any other suitable devices within environment 100 of FIG. 2. For example, the control circuitry may query each device in environment 100 or otherwise receive data indicating whether a particular device is capable of processing a voice input and/or performing an action based on voice input. Such processing may comprise, for example, detecting an utterance and/or performing at least some processing to analyze or parse the input, and performing an action based on voice input may comprise a device capable of receiving an instruction modifying its state, performing a task and/or providing an output.

At 1304, the control circuitry may determine state information for each of the plurality of identified devices. In some embodiments, such state information may include the voice processing capabilities described as being identified in connection with 1302. In some embodiments, the device state information may comprise an indication of whether a particular device is turned on or off; an indication of voice processing capabilities of a particular device; an indication of device settings of a particular device; an indication of one or more characteristics of a particular device; an indication of an action previously performed, currently being performed or to be performed by a particular device; metadata related to a media asset being played via the device; and/or any other suitable device state information and/or metadata associated with discovered devices of environment 100. The voice processing application may be configured to generate data structure 124 of FIG. 1, e.g., in a tabular format, and/or any other suitable format, based on data requested and/or received from the devices of environment 100 of FIG. 1 and/or data requested and/or received from any suitable information source.

At 1306, the control circuitry may determine, based at least in part on the device state information obtained at 1304 and/or 1302, a predicted voice command, and a particular device for which the predicted voice command is intended. In some embodiments, the control circuitry may further determine a location of user 102 and/or 104 in environment 100 using any suitable technique, e.g., by analyzing wireless signal information in environment 100, determining a location of user device 114 and comparing such location to a known location of TV 106, etc.) For example, based on such information, if the control circuitry determines that the device state information indicates that TV 106 is currently turned on and/or that user 102 is located proximate to TV 106, the control circuitry may predict probable voice commands, instructions and/or comments that a user might utter with respect to a TV that is currently providing content. Such predicted voice commands may be based on, for example, a compilation of voice shortcuts of connected devices of environment 100 previously received or otherwise obtained by the control circuitry with respect to particular devices. In some embodiments, determining a particular device for which the predicted voice command might be intended may be based on the contextual information such as, for example, a location of a user, considered in conjunction with the state information, e.g., whether TV 106 is currently on and/or providing content. In some embodiments, if a most recent user interaction with TV 106 is within a threshold time period, this may weigh towards a user actively using TV 106, rather than just passing by TV 106, which may indicate that user 102 is more likely to issue a voice command associated with TV 106. In some embodiments, a knowledge graph (e.g., knowledge graph 300) may be updated (e.g., such as knowledge graph 400 of FIG. 4) based on the detected state information and contextual information such as, for example, a location of a user, e.g., to include various nodes and edges mapping out inferences based on the received information, with respect to the particular device.

In some embodiments, candidate devices may be ranked to determine which device a predicted voice input likely is intended for. For example, if each of TV 108 and TV 106 is determined to be on, based on device state information, it may be unclear which TV is more likely to be the subject of a voice query. However, if the location of user 102 is considered, and user 102 is determined to be located closer to TV 106 than TV 108, TV 106 may be ranked higher as a candidate device for voice input than TV 108. In some embodiments, the ranking may be based on past voice commands issued by user 102 in connection with a user profile. For example, if a user historically has issued certain voice commands at certain times and/or under certain circumstances (e.g., when a user is in a particular room, and/or when a particular device is on or in a particular state), such voice commands may be ranked high as probable commands the user might issue.

At 1308, the control circuitry may receive voice input, e.g., voice input 122 of "It is loud." In some embodiments, such voice input may be received prior to control circuitry performing steps 1302, 1304, and 1306. For example, the control circuitry may determine a predicted voice command and device to which the predicted voice command is intended, in response to receiving the voice input. In such an instance, the control circuitry may take into account the voice input itself, e.g., "It is loud," when determining a predicted voice command potentially intended by such voice input, and the particular device for which the predicted voice command may be intended. For example, as shown in FIG. 4, the control circuitry may map voice input 122 of "It is loud," which may be represented by node 402, to voice command "Decrease volume" indicated at node 328, and TV 106 indicated at node 302.

In some embodiments, the voice input, e.g., voice input 122 of "It is loud," may be received subsequent to the control circuitry performing steps 1302, 1304 and 1306. For example, the control circuitry may anticipate that a voice input or voice command is likely to be received based on the device state information and/or other contextual information, and/or historical tendencies of a user profile of user 102. In some embodiments, the control circuitry may determine predicted voice commands at all times, based on user settings specifying certain times to determine predicted voice commands, based on certain times of day user 102 is likely to be awake, and/or based on any other suitable criteria.

At 1310, when voice input e.g., voice input 122 of "It is loud," is received from the user, e.g., user 102, the control circuitry may utilize knowledge graphs (e.g., local to environment 100 and/or at remote server 126) or any other suitable technique to determine if voice input 122 is related to the voice command of node 328 of FIG. 4. For example, the control circuitry may, in real time, analyze an intent of the voice input and determine whether any actions should be performed. Control circuitry 1211 of server 1204 may, based on device state information and/or contextual information received from one or more of the connected devices of environment 100, update knowledge graph 300 of FIG. 3 in the manner shown in FIG. 4 and/or any of the other examples described herein, based on voice input 122. In some embodiments, updating the knowledge graph may comprise adding or deleting certain nodes (e.g., deleting a node representing a device that is off or unplugged) on a temporary basis. Control circuitry 1211 of server 1204 may transmit at least a portion of such updated knowledge graph 400, and/or any other suitable data, to one or more of the connected devices of environment 100 and/or database 222, and/or any other suitable data. Based on such received data, the control circuitry may enable the mapping of voice input 122 (represented by node 402) to node 302 (e.g., the particular device to which predicted voice command "Decrease volume" is intended) and the voice command of node 328. For example, the control circuitry may determine that received input 122 matches predicted input or node 402, and thus TV 106 should be instructed to perform the action of node 328, and/or that received input 122 is related to the predicted voice command represented by node 328, as evidenced by the mapping of knowledge graph 400. In some embodiments, such aspects may enable the control circuitry to process locally a large number of frequently used or predicted commonly used commands, instructions and/or comments.

Processing may proceed to 1312 upon determining that voice input 122 is related to (e.g., matches or is otherwise linked to) the predicted voice command of "Decrease volume" represented by node 328. At 1312, the control circuitry may cause an action associated with the predicted voice command determined to be performed. For example, voice assistant 110 may transmit an instruction to smart TV 106 to decrease a volume of a currently playing media asset, based on voice command 128, e.g., determined locally or at server 126. In some embodiments, smart television 106 may receive such instruction from server 126 (e.g., via networking equipment 116) or from any other suitable device within or external to environment 100. In some embodiments, the control circuitry, in processing the determined intended voice command and causing the volume of TV 106 to be decreased at 1312, may convert text associated with the voice command to speech, e.g., to generate for output an audio notification indicating that the volume of TV 106 has been decreased. For example, the control circuitry may be configured to generate an affirmative response indicating on which device action will be taken, e.g., for a voice command "Turn off the alarm output audio" the affirmative response of "Turning off the mobile device [114] alert". Additionally or alternatively, the control circuitry may provide a textual indication to notify user 102 that the volume of TV 106 has been decreased. In some embodiments, the control circuitry may prompt the user for feedback to indicate whether the inferred voice command aligns with the user's intent by uttering voice input 122, and the weights and/or nodes and/or edges of the knowledge graph may be refined based on such input. As another example, the control circuitry may determine based on subsequent user action or inaction whether an inferred voice command was accurate, e.g., if the user continues watching the content on TV 106 at the adjusted volume, and/or does not immediately utter another voice input or otherwise interact with TV 106.

Processing may proceed to 1314 upon determining at 1310 that voice input 122 is unrelated to the predicted voice command of "Decrease volume" represented by node 328 of FIG. 4. For example, such circumstance may be inferred if the control circuitry is unable to resolve the voice input locally (e.g., using the updated knowledge graph, via one or more of the connected devices of environment 100), and such voice input may be transmitted to server 126 for further processing. For example, complex queries and/or unpredicted voice inputs, comments or queries may be transmitted to a server, optionally only if a wake word or signature word is detected. In some embodiments, processing may proceed to 1314 if, at 1310, the control circuitry determines that a particular device to which the received voice input is directed is ambiguous, and/or the user may be prompted to clarify what he or she intends by the voice input.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A computer-implemented method, comprising:

identifying a plurality of devices connected to a localized network and capable of processing, or performing one or more actions based at least in part on, one or more voice inputs;

identifying a plurality of voice commands, wherein for each respective voice command of the plurality of voice commands, at least one device of the plurality of devices is capable of processing, or performing one or more actions based at least in part on, the respective voice command;

generating a knowledge graph comprising a first plurality of nodes respectively representing the plurality of devices and a second plurality of nodes respectively representing the plurality of voice commands, wherein a relationship between a first node of the first plurality of nodes and a second node of the second plurality of nodes indicates that a first device represented by the first node is capable of processing, or performing one or more actions based at least in part on, a first voice command represented by the second node;

determining device state information for each of the plurality of devices;

determining, using the knowledge graph and based at least in part on the device state information:
  the first voice command as a predicted voice command; and
  the first device as a particular device of the plurality of devices for which the predicted voice command is intended, wherein the determination of the predicted voice command and the particular device comprises:
    accessing the knowledge graph;
    based at least in part on determining that the device state information indicates a status for the particular device of currently available, updating the knowledge graph to comprise a third node representing the currently available status of the particular device, wherein the third node is an intermediate node connected to each of the first node representing the particular device and the second node representing the particular voice command; and
    using the updated knowledge graph to determine the predicted voice command and to determine the particular device;
receiving voice input; and
based at least in part on receiving the voice input, causing the particular device to perform an action related to the predicted voice command.

2. The method of claim 1, wherein:
each of determining the predicted voice command, and determining the particular device, is performed prior to receiving the voice input;
causing the particular device to perform the action related to the predicted voice command is performed in response to determining the received voice input matches or is related to the predicted voice command; and
at least a portion of the determining of the predicted voice command, and the determining of the particular device, is performed locally on one or more of the plurality of devices connected to the localized network.

3. The method of claim 1, wherein:
each of determining the predicted voice command, and determining the particular device, is performed in response to receiving the voice input, based at least in part on processing the voice input, and
at least a portion of the determining of the predicted voice command, the determining of the particular device and the processing of the voice input, is performed locally on one or more of the plurality of devices connected to the localized network.

4. The method of claim 1, wherein determining the particular device further comprises:
determining a first candidate device of the plurality of identified devices and a second candidate device of the plurality of identified devices, for which the predicted voice command is intended;
determining that a user associated with the voice input is located closer to the first candidate device than the second candidate device; and
identifying the first candidate device as the particular device.

5. The method of claim 4, wherein determining that the user associated with the voice input is located closer to the first candidate device than the second candidate device is performed based at least in part on wireless signals received over the localized network by networking equipment from the first candidate device and wireless signals received over the localized network by the networking equipment from the second candidate device, wherein the networking equipment is a router or gateway associated with the localized network that is distinct from the first candidate device and the second candidate device.

6. The method of claim 1, wherein determining the predicted voice command, and determining the particular device, comprises transmitting the device state information to a server, and receiving from the server an indication of the predicted voice command and an indication of the particular device.

7. The method of claim 1,
wherein at least a portion of the knowledge graph is stored locally at one or more of the plurality of devices connected to the localized network.

8. The method of claim 1, wherein the device state information comprises, for each respective device of the plurality of devices, one or more of:
an indication of whether the device is turned on;
an indication of current settings of the device;
an indication of voice processing capabilities of the device;
an indication of one or more characteristics of the device;
an indication of an action previously performed, currently being performed or to be performed by the device; or
metadata related to a media asset being played via the device.

9. The method of claim 1, further comprising:
generating a list comprising a first signature word that is associated with voice inputs for the first device of the plurality of devices, and a second signature word that is associated with voice inputs for a second device of the plurality of devices;
determining, at the first device, that the voice input comprises the second signature word; and
in response to determining that the voice input comprises the second signature word, performing processing of the voice input at least in part at the first device.

10. The method of claim 1, the method further comprising:
determining that device state information for a second device of the plurality of devices indicates that the second device is not available; and
based at least in part on determining that the device state information for the second device of the plurality of devices indicates that the second device is not available, removing a node from the knowledge graph that corresponds to the second device.

11. The method of claim 1, further comprising:
determining to remove, from the knowledge graph, at least one node of the second plurality of nodes, the at least one node corresponding to at least one voice command of the plurality of voice commands;
identifying a voice command comprising a wake word;
based at least in part on the voice command corresponding to the wake word, determining that a node corresponding to the voice command comprising the wake word is not to be removed; and
based at least in part on the determination to remove the at least one node and the determination that the node corresponding to the voice command comprising the wake word is not to be removed, removing a node other than the node corresponding to the voice command comprising the wake word.

12. A computer-implemented system, comprising:
memory;
control circuitry configured to:

identify a plurality of devices connected to a localized network and capable of processing, or performing one or more actions based at least in part on, one or more voice inputs;

identify a plurality of voice commands, wherein for each respective voice command of the plurality of voice commands, at least one device of the plurality of devices is capable of processing, or performing one or more actions based at least in part on, the respective voice command;

generate a knowledge graph comprising a first plurality of nodes respectively representing the plurality of devices and a second plurality of nodes respectively representing the plurality of voice commands, wherein a relationship between a first node of the first plurality of nodes and a second node of the second plurality of nodes indicates that a first device represented by the first node is capable of processing, or performing one or more actions based at least in part on, a first voice command represented by the second node;

determine device state information for each of the plurality of devices, wherein the device state information is stored in the memory;

determine, using the knowledge graph and based at least in part on the device state information:
the first voice command as a predicted voice command; and
the first device as a particular device of the plurality of devices for which the predicted voice command is intended, wherein the determination of the predicted voice command and the particular device comprises:
accessing the knowledge graph;
based at least in part on determining that the device state information indicates a status for the particular device of currently available, updating the knowledge graph to comprise a third node representing the currently available status of the particular device, wherein the third node is an intermediate node connected to each of the first node representing the particular device and the second node representing the particular voice command; and
using the updated knowledge graph to determine the predicted voice command and to determine the particular device;

receive voice input; and based at least in part on receiving the voice input, cause the particular device to perform an action related to the predicted voice command.

13. The system of claim 12, wherein the control circuitry is configured to:
determine the predicted voice command, and determine the particular device, prior to receiving the voice input;
cause the particular device to perform the action related to the predicted voice command in response to determining the received voice input matches or is related to the predicted voice command; and
perform at least a portion of the determining of the predicted voice command, and the determining of the particular device, locally on one or more of the plurality of devices connected to the localized network.

14. The system of claim 12, wherein the control circuitry is configured to:
determine the predicted voice command, and determine the particular device, in response to receiving the voice input, based at least in part on the voice input; and
perform at least a portion of the determining of the predicted voice command, the determining of the particular device, and the processing of the voice input, locally on one or more of the plurality of devices connected to the localized network.

15. The system of claim 12, wherein the control circuitry is configured to determine the particular device by:
determining a first candidate device of the plurality of identified devices and a second candidate device of the plurality of identified devices, for which the predicted voice command is intended;
determining that a user associated with the voice input is located closer to the first candidate device than the second candidate device; and
identifying the first candidate device as the particular device.

16. The system of claim 15, wherein the control circuitry is configured to determine that the user associated with the voice input is located closer to the first candidate device than the second candidate device based at least in part on wireless signals received over the localized network by networking equipment from the first candidate device and wireless signals received over the localized network by the networking equipment from the second candidate device, wherein the networking equipment is a router or gateway associated with the localized network that is distinct from the first candidate device and the second candidate device.

17. The system of claim 12, wherein the control circuitry is configured to determine the predicted voice command, and determine the particular device, by transmitting the device state information to a server, and receiving from the server an indication of the predicted voice command and an indication of the particular device.

18. The system of claim 12,
wherein at least a portion of the knowledge graph is stored locally at one or more of the plurality of devices connected to the localized network.

19. The system of claim 12, wherein the device state information comprises, for each respective device of the plurality of devices, one or more of:
an indication of whether the device is turned on;
an indication of current settings of the device;
an indication of voice processing capabilities of the device;
an indication of one or more characteristics of the device;
an indication of an action previously performed, currently being performed or to be performed by the device; or
metadata related to a media asset being played via the device.

20. The system of claim 12, wherein the control circuitry is configured to:
generate a list comprising a first signature word that is associated with voice inputs for the first device of the plurality of devices, and a second signature word that is associated with voice inputs for a second device of the plurality of devices;
determine, at the first device, that the voice input comprises the second signature word; and
in response to determining that the voice input comprises the second signature word, perform processing of the voice input at least in part at the first device.

* * * * *